United States Patent
Newkirk

(10) Patent No.: US 10,055,376 B1
(45) Date of Patent: Aug. 21, 2018

(54) SERIAL PERIPHERAL INTERFACE SYSTEM WITH SLAVE EXPANDER

(71) Applicant: Maxim Integrated Products, Inc., San Jose, CA (US)

(72) Inventor: Ellis Neil Newkirk, Flower Mound, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 273 days.

(21) Appl. No.: 14/860,625

(22) Filed: Sep. 21, 2015

Related U.S. Application Data

(60) Provisional application No. 62/103,718, filed on Jan. 15, 2015.

(51) Int. Cl.
  *G06F 13/00* (2006.01)
  *G06F 13/42* (2006.01)
  *G06F 13/364* (2006.01)
  *G06F 13/40* (2006.01)
  *G06F 13/362* (2006.01)

(52) U.S. Cl.
  CPC ........ *G06F 13/4256* (2013.01); *G06F 13/362* (2013.01); *G06F 13/364* (2013.01); *G06F 13/404* (2013.01); *G06F 13/4068* (2013.01); *G06F 13/4282* (2013.01); *G06F 13/4291* (2013.01)

(58) Field of Classification Search
  None
  See application file for complete search history.

(56) References Cited

U.S. PATENT DOCUMENTS

| | | | | |
|---|---|---|---|---|
| 5,619,722 A | * | 4/1997 | Lovrenich | G06F 13/385 710/2 |
| 5,878,234 A | * | 3/1999 | Dutkiewicz | G06F 13/423 710/110 |
| 7,032,039 B2 | | 4/2006 | DeCaro | |
| 7,082,481 B2 | * | 7/2006 | Lambrache | G06F 13/4054 710/52 |
| 7,584,305 B2 | * | 9/2009 | Hsieh | G06F 13/102 710/110 |
| 7,603,501 B2 | * | 10/2009 | Hsieh | G06F 13/4291 710/110 |
| 7,761,633 B2 | * | 7/2010 | Devila | G06F 13/4291 340/9.1 |
| 8,433,838 B2 | | 4/2013 | Crockett et al. | |
| 8,510,485 B2 | * | 8/2013 | Wilson | G06F 13/4291 710/52 |

(Continued)

OTHER PUBLICATIONS

'SPI Tutorial' by Corelis, archived Oct. 26, 2014.*

(Continued)

*Primary Examiner* — Steven Snyder
(74) *Attorney, Agent, or Firm* — Robert Crownover

(57) ABSTRACT

A serial peripheral interface system with a slave expander method and apparatus can include: receiving a data stream from a master device, the data stream beginning with an address; decoding the address as the data stream is being received; activating an independent slave select after the address is decoded and before a second portion of the data stream is received; and deactivating the independent slave select based on a slave select from the master device being deactivated.

20 Claims, 8 Drawing Sheets

(56) References Cited

U.S. PATENT DOCUMENTS

| | | | | |
|---|---|---|---|---|
| 8,984,196 | B2* | 3/2015 | Decesaris | G06F 13/4291 710/110 |
| 9,411,770 | B2* | 8/2016 | Decesaris | G06F 13/4291 |
| 2004/0139258 | A1* | 7/2004 | Chambers | G06F 13/4291 710/110 |
| 2005/0114567 | A1* | 5/2005 | Lambrache | G06F 13/4054 710/52 |
| 2007/0143512 | A1* | 6/2007 | Kuo | G06F 13/4291 710/110 |
| 2008/0005434 | A1* | 1/2008 | Lee | G06F 13/4291 710/110 |
| 2008/0183928 | A1* | 7/2008 | Devila | G06F 13/4291 710/110 |
| 2009/0125657 | A1* | 5/2009 | Hsieh | G06F 13/102 710/110 |
| 2009/0193165 | A1* | 7/2009 | Hsieh | G06F 13/4291 710/110 |
| 2011/0072297 | A1* | 3/2011 | Huang | G06F 13/4282 713/500 |
| 2011/0078350 | A1* | 3/2011 | Carls | G06F 1/04 710/110 |
| 2011/0113171 | A1* | 5/2011 | Radhakrishnan | G06F 13/4291 710/110 |
| 2012/0066423 | A1* | 3/2012 | Choo | G06F 13/4291 710/110 |
| 2012/0072628 | A1* | 3/2012 | Crockett | G06F 13/4291 710/110 |
| 2014/0149805 | A1* | 5/2014 | Michihata | G06F 13/4282 714/48 |
| 2017/0083467 | A1* | 3/2017 | Mishra | G06F 13/362 |

OTHER PUBLICATIONS

'Project 8a: chipKIT Pro and Serial Communications Synchronous SPI Serial Communications' by Digilent, archived Jul. 18, 2014.*
'AN-1248 Application Note' by Analog Devices, copyright 2013.*
'Serial Peripheral Interface (SPI) Tutorial' from embeddedmicro, archived Jun. 19, 2014.*
'Using Serial Peripheral Interface (SPI) with Microchip PIC18 Families Microcontroller' by ermicroblog, Sep. 12, 2010.*
'XRA1402 8-Bit SPI GPIO Expander' datasheet from EXAR, Sep. 2011.*
'SPI Slave Port Expander' by Lattice Semiconductor, Apr. 2013.*
'Serial-Control Multiplexer Expands SPI Chip Selects' by Maxim, Jul. 1, 2001.*
'MCP23008/MCP23S08' datasheet from MicroChip, copyright 2007.*
'USBI2C/SPI/GPIO Interface Adapters' by DLNWARE, archived on Jan. 11, 2015.*
'PCA9502—8-bit I/O expander with I2C-bus/SPI interface' Rev. 4, Product data sheet, NXP, Feb. 23, 2016.*
'Promira Serial Platform I2C/SPI Active User Manual' copyright 2003-2016, Total Phase, Inc.*

* cited by examiner

SERIAL PERIPHERAL INTERFACE SYSTEM WITH SLAVE EXPANDER

CROSS-REFERENCE TO RELATED APPLICATIONS

This claims priority benefit to all common subject matter of U.S. Provisional Patent Application No. 62/103,718 filed Jan. 15, 2015. The content of this application is incorporated herein by reference in its entirety.

TECHNICAL FIELD

This disclosure relates to synchronous serial data link structures, more particularly to serial peripheral interface busses.

BACKGROUND

The rapidly growing portable electronics market, e.g. cellular phones, laptop computers, and wearable devices, are an integral facet of modern life. The multitude of portable devices represents one of the largest potential market opportunities for next generation electronic components. These devices have unique attributes that have significant impacts on their integration, in that they must be generally small, lightweight, energy efficient, rich in functionality, and they must be produced in high volumes at relatively low cost.

An important technology within the electronics components industry is the serial peripheral interface. Serial peripheral interfaces are relied upon across many markets, including serial memory, data conversion, displays, communications, real time clocks, human interface, microelectromechanical systems, temperature sensors, and controllers.

In recent years, the serial interface has become more prevalent than the parallel interface by offering a low pin count, low power consumption, and smaller packages. The serial interface typically uses a two wire configuration and sometimes a third wire for clock signals. Other wire arrangements can be found but a clock signal is always present.

The increasing popularity of the serial interface has led to the development of the serial peripheral interface protocol. The serial peripheral interface protocol standardizes the pins for serial interface devices and defines a group of such pins as a serial peripheral interface bus.

In many serial peripheral interface system designs there is a single master device and multiple slave devices that the master device is required to communicate with. The master device is typically a microprocessor or field-programmable gate array device, while the slave devices can be integrated circuits ranging from peripherals including Ethernet adapters and USB controllers, to digital and analog converters used for codecs and analog sensors, to memory.

Despite the pervasive use of the serial peripheral interface and the standardizing effect of the serial peripheral interface protocol, many challenges exist with the use of the serial peripheral interface; of particular concern, is the inability to use multiple dissimilar slave devices with a single master device. This problem increases costs of manufacture, design, and implementation while simultaneously decreasing design flexibility since only compatible master devices and slave devices can be used together. Only partial solutions have been developed to address this problem.

One previous development is to provide a master device having multiple slave select pins to create an independent slave configuration. The shortcoming of this development is that many standardized master devices do not have the functionality or available pins to provide the additional slave select pins.

Another previous development is to daisy chain multiple slave devices together and shift data across all the devices with additional clocking from the master device. The shortcoming of this development is that the slave devices must be cooperative such that they shift their input data into their output data pin. Further, even with cooperative slave devices the slave types must be the same.

Another previous development includes the mini-serial peripheral interface protocol requiring each slave device to share the same pins controlled by the master device, to decode a first data byte, and to recognize a preset address to respond to. The shortcoming of this development is that very few slave devices recognize the mini-serial peripheral interface protocol and cannot share a serial peripheral interface bus with non mini-serial peripheral interface slave devices.

Solutions have been long sought but prior developments have not taught or suggested any complete solutions, and solutions to these problems have long eluded those skilled in the art. Thus there remains a considerable need for devices and methods that can allow a multiple dissimilar slave devices to share a single master device's serial peripheral interface communication bus.

SUMMARY

A serial peripheral interface system with slave expander, allowing multiple dissimilar slave devices to share a single master device's serial peripheral interface communication bus, is disclosed. The serial peripheral interface system with slave expander includes: receiving a data stream from a master device, the data stream beginning with an address; decoding the address as the data stream is being received; activating an independent slave select after the address is decoded and before a second portion of the data stream is received; and deactivating the independent slave select based on a slave select from the master device being deactivated.

Accordingly it has been discovered that one or more contemplated embodiments of the serial peripheral interface system with slave expander described herein enable: a master device with only one slave select pin to communicate with multiple dissimilar slave devices directly; a slave expander circuitry to be implemented into a single slave device that then allows multiple other slave devices to share the same master device; a transaction between a master device and a slave device to occur with a single slave select cycle maintaining communication speed and efficiency; a master device and slave device protocol relationship to remain unaffected after the initial slave select address byte even to different slave types sharing the same bus; and a master device to be multiplexed to multiple slave devices with no additional components.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The serial peripheral interface system is illustrated in the figures of the accompanying drawings which are meant to be exemplary and not limiting, and in which.

DETAILED DESCRIPTION

Figure 1:
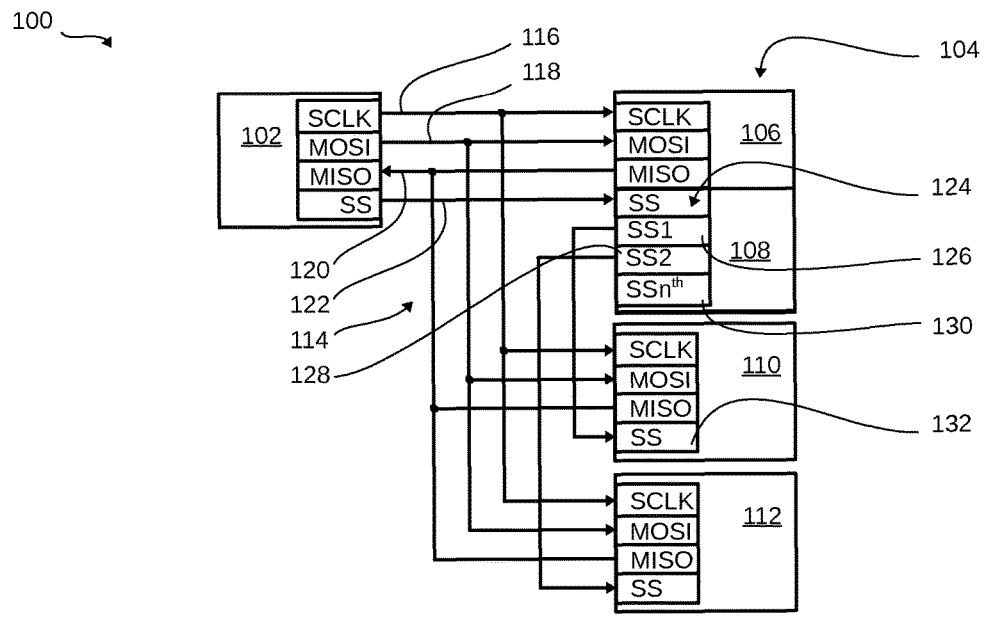
FIG. 1 is a schematic view of a serial peripheral interface system in a first embodiment.

In the following description, reference is made to the accompanying drawings that form a part hereof, and in which are shown by way of illustration, embodiments in which the serial peripheral interface system may be practiced. It is to be understood that other embodiments may be utilized and structural changes may be made without departing from the scope of the serial peripheral interface system.

When features, aspects, or embodiments of the serial peripheral interface system are described in terms of steps of a process, an operation, a control flow, or a flow chart, it is to be understood that the steps can be combined, performed in a different order, deleted, or include additional steps without departing from the serial peripheral interface system as described herein.

The serial peripheral interface system is described in sufficient detail to enable those skilled in the art to make and use the serial peripheral interface system and provide numerous specific details to give a thorough understanding of the serial peripheral interface system; however, it will be apparent that the serial peripheral interface system may be practiced without these specific details.

In order to avoid obscuring the serial peripheral interface system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. As used herein, a direct connection is a connection between two pins with or without wire or its functional equivalent and no other intervening components. As used herein, the term "system" is defined as a device or method depending on the context in which it is used.

Referring now to FIG. 1, therein is shown a schematic view of a serial peripheral interface system 100 in a first embodiment. The serial peripheral interface system 100 is depicted having a master device 102 and slave devices 104. The slave devices 104 can include multiple devices such as a first slave device 106 having slave expander circuitry 108, and can further include a second slave device 110 and third slave device 112.

The master device 102 and the slave devices 104 are shown connected to a serial peripheral interface bus (SPI bus 114). The SPI bus 114 can include a serial clock (SCLK 116), a master output slave input (MOSI 118), a master input slave output (MISO 120), and a slave select (SS 122).

The SCLK 116 and the MOSI 118 are outputs of the master device 102 and inputs to the slave devices 104 while the MISO 120 is an input of the master device 102 and an output of the slave devices 104. The SS 122 is an active low output of the master device 102 and an input to the first slave device 106.

The first slave device 106 is further shown having independent slave select outputs (SSns 124). The SSns 124 can be active low outputs for asserting and activating the slave devices 104. The SSns 124 can include a first independent slave select (SS1 126), a second independent slave select (SS2 128), and an $n^{th}$ independent slave select (SSn$^{th}$ 130). The second slave device 110 and the third slave device 112 are shown to include slave select input pins (SS inputs 132).

The SS inputs 132 of the second slave device 110 is connected to the SS1 126 of the first slave device 106 and the SS inputs 132 of the third slave device 112 is connected to the SS2 128 of the first slave device 106. It is contemplated that the first slave device 106, with the slave expander circuitry 108, could be implemented with a complex programmable logic device or a field-programmable gate array. It is further contemplated that the slave expander circuitry 108 could be implemented on a digital logic control block of an integrated circuit and functioning as a slave device 104.

Figure 3:
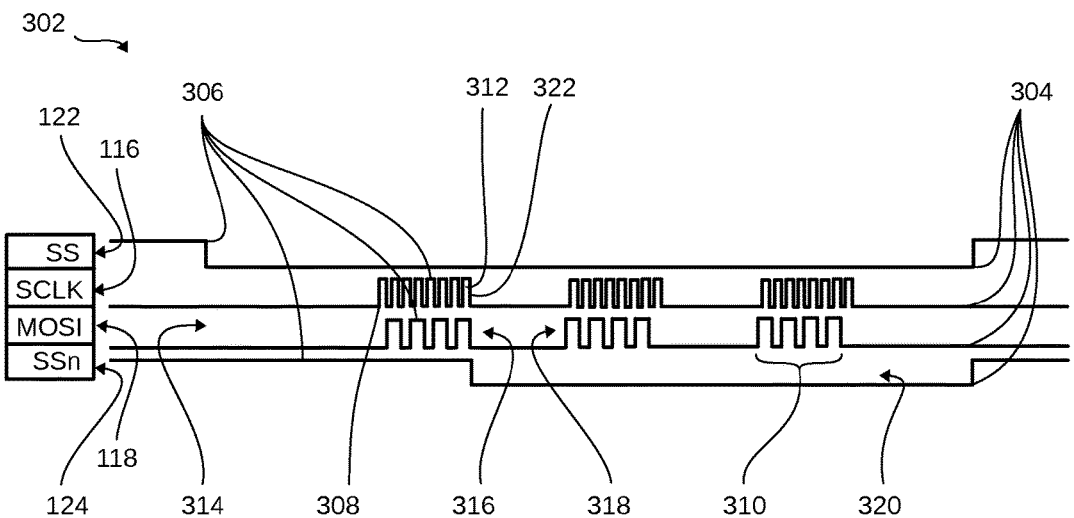
FIG. 3 is a timing diagram for the byte decoder of FIG. 2.

The additional slave expander circuitry 108 of the first slave device 106 allows the other slave devices 104 to communicate with the master device 102 by providing the low value 304 of FIG. 3 on the SSn 124 corresponding and connected to a slave device 104 that is selected by the master device 102. It is contemplated that the master device 102 can output the low value 304 on the SS 122 and can provide the data stream 314 of FIG. 3 on the MOSI 118.

An initial portion of the data stream 314 can be the address header 316 of FIG. 3. The address header 316 can identify one or more of the slave devices 104. Communication can be enabled between the master device 102 and the slave devices 104 once the address header 316 is decoded and identifies one or a group of the slave devices 104. The address header 316 is described as being 1 byte long; however it is contemplated that the address header 316 could be longer or shorter.

Figure 2:
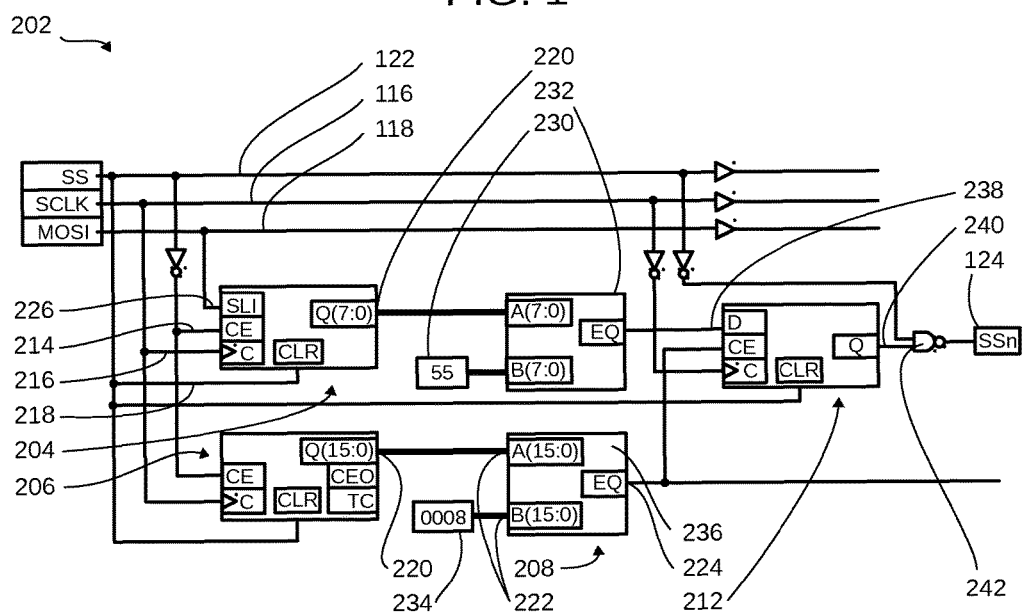
FIG. 2 is a schematic view of a byte decoder in the slave expander circuitry of FIG. 1.

The slave expander circuitry 108 can include the byte decoders 202 of FIG. 2. The byte decoders 202 can decode the address header 316 of the data stream 314 from the MOSI 118 of the master device 102.

The first slave device 106, having the slave expander circuitry 108, can then output the low value 304 on the SSn 124 corresponding to the slave devices 104 identified by the address header 316 before a data portion 318 of FIG. 3 of the data stream 314 arrives.

Once the low value 304 is output on the SSn 124 corresponding to the slave devices 104 identified by the address header 316, the master device 102 will communicate directly with the slave devices 104 identified by the address header 316 via the MOSI 118 and the MISO 120. Once the master device 102 outputs the high value 306 of FIG. 3 on the SS 122, the first slave device 106 will output the high value 306 on the SSn 124 corresponding to the slave devices 104 identified by the address header 316.

Alternatively, it is contemplated that the first slave device 106 could be the slave device 104 identified by the address header 316. When the first slave device 106 is identified, the slave expander circuitry 108 of the first slave device 106 would not output the low value 304 on the SSns 124 unless the first slave device 106 is daisy chained to other slave devices 104.

When the first slave device 106 is part of a daisy chain, the first slave device 106 will output the low value 304 on the SSns 124 corresponding to the other slave devices 104 in the daisy chain. Daisy chained devices are devices having the MISO 120 of one slave device 104 connected to the MOSI 118 of the next slave device 104 in the daisy chain.

It has been discovered that implementing the slave expander circuitry 108 within the first slave device 106 of the serial peripheral interface system 100 allows the master device 102 to communicate with the slave device 104 identified by the address header 316 while the slave expander circuitry 108 appears completely transparent after the initial address header 316. It has further been discovered that implementing the slave expander circuitry 108 within the first slave device 106 of the serial peripheral interface system 100 allows a large number of dissimilar slave devices 104 to share a single SPI bus 114.

It has been further discovered that the slave expander circuitry 108 could be implemented as an additional feature to existing serial peripheral interface products. As an illustrative example, a slave device such as a digital to analog converter (DAC) could utilize additional pins and allow a designer to expand an existing SPI bus 114 for use with other slave devices 104 providing a high degree of design flexibility in situations where the master device 102 is fixed or limited, such as a low end microprocessor or a universal serial bus host adapter.

Although the slave expander circuitry 108 is depicted as internal to the first slave device 106, it is contemplated that the slave expander circuitry 108 could be implemented as a feature to serial peripheral interface port expanders. The slave expander circuitry 108 would allow a serial peripheral interface port expander to be inserted between an existing master device 102 and slave device pair, providing not only additional inputs and outputs but also support for additional slaves to a designer without needing to add to the master device 102's capabilities.

Referring now to FIG. 2, therein is shown a schematic view of a byte decoder 202 in the slave expander circuitry 108 of FIG. 1. It is contemplated that the slave expander circuitry 108 could include multiple byte decoders 202, one for decoding each address for the slave devices 104 of FIG. 1 identified by the address header 316 of FIG. 3.

It is further contemplated that a single byte decoder 202 may be used to decode the address header 316 for multiple addresses corresponding to groups or individual slave devices 104. It is yet further contemplated that the byte decoder 202 could be implemented in other variations of hardware or software without departing from the serial peripheral interface system 100 of FIG. 1.

The byte decoder 202 is depicted being connected to the SS 122, the SCLK 116, and the MOSI 118 of the SPI bus 114 of FIG. 1. Further the byte decoder 202 is shown having the SSns 124 as outputs.

The byte decoder 202 can include a shift register 204 and a counter 206 connected to the SS 122, and the SCLK 116 of the SPI bus 114. The shift register 204 can be an address receiver and can further be connected to the MOSI 118 of the SPI bus 114. The shift register 204 and the counter 206 can be connected to comparators 208. The comparators 208 can be connected to a flip-flop 212, which can be connected to the SS 122 and the SCLK 116 of the SPI bus 114.

The shift register 204, the counter 206, and the flip-flop 212 are depicted having inputs including a clock enable 214, a clock input 216, and a clear 218. The shift register 204 and the counter 206 can have parallel outputs 220.

The parallel outputs 220 of the shift register 204 and the counter 206 can be coupled to parallel inputs 222 of the comparators 208. For descriptive clarity, the parallel outputs 220 and parallel inputs 222 are shown connected with thicker lines indicating a bus as are other busses within the byte decoder 202 with the exception of the SPI bus 114, which has been broken out. The comparators 208 can also include equal outputs 224.

The shift register 204 can be a serial-in parallel-out shift register. When the low value 304 of FIG. 3 is output on the SS 122 by the master device 102 of FIG. 1, the shift register 204 will be enabled with an inverted value of the SS 122 on the clock enable 214 and the low value 304 from the SS 122 on the clear 218. Once enabled, the shift register 204 will shift the address header 316 from a serial input 226 and provide the address header 316 as the parallel output 220.

The address header 316 on the parallel output 220 of the shift register 204 is then compared to an address constant 230 with an address comparator 232. The address comparator 232 can be an eight bit identity comparator for decoding the address header 316. When the address header 316 at the parallel output 220 of the shift register 204 is identical to the address constant 230, the high value 306 of FIG. 3 will be output on the equal output 224 of the address comparator 232.

The address constant 230 input of the address comparator 232 can be a hexadecimal address corresponding or identifying one of the slave devices 104. The address constant 230 input of the address comparator 232 can also correspond to or identify one of the SSns 124.

Yet further, the address constant 230 input of the address comparator 232 can correspond to or identify groups of the slave devices 104. The address constant 230 is illustratively depicted as the expected hexadecimal address of 55.

The counter 206 can be a cascadable binary counter. When the low value 304 is output on the SS 122 by the master device 102, the counter 206 will be enabled with an inverted value of the SS 122 on the clock enable 214 and the low value 304 on the clear 218. Once enabled, the counter 206 will provide a count incremented during low-to-high clock transitions of the SCLK 116 provided at the clock input 216.

The counter 206 can provide the parallel output 220 of the count. The parallel output 220 of the counter 206 is then compared with a count constant 234 on a count comparator 236. The count comparator 236 can be a sixteen bit identity comparator. When the parallel output 220 of the counter 206 is identical to the count constant 234, the high value 306 will be output on the equal output 224 of the count comparator 236.

The count constant 234 can be a hexadecimal count of eight representing the eighth clock cycle 312 of FIG. 3 of the SCLK 116. The equal output 224 of the count comparator 236 can be connected to the clock enable 214 of the flip-flop 212.

The equal output 224 of the address comparator 232 can be connected to a D input 238 of the flip-flop 212. The flip-flop 212 can be a D flip-flop with clock enable and asynchronous clear.

When the high value 306 is output by the master device 102 on the SS 122, the clear 218 on the flip-flop 212 is asserted and an output 240 of the flip-flop 212 is set to 0. Otherwise, when the low value 304 is output on the SS 122, the clock enable 214 of the flip-flop 212 is examined during the low-to-high transition of the SCLK 116 at the clock input 216, which is an inverted signal of the SCLK 116. If the clock enable 214 of the flip-flop 212 is asserted by the equal output 224 of the count comparator 236, the data on the input 238 of the flip-flop 212 from the address comparator 232, is loaded to the output 240 of the flip-flop 212; otherwise, the output 240 of the flip-flop 212 retains its previous value.

In summary, when the address header 316 matches the address constant 230, the address comparator 232 will output the high value 306 at the input 238 of the flip-flop 212. When the SCLK 116 reaches the eighth clock cycle 312, the count comparator 236 will output the high value 306 at the clock enable 214 of the flip-flop 212. Providing the high value 306 at the input 238 of the flip-flop 212 and the high value 306 at the clock enable 214 of the flip-flop 212 will result in the high value 306 at the output 240 of the flip-flop 212 on the falling edge 322 of FIG. 3 of the eighth clock cycle 312 of the SCLK 116.

The output 240 of the flip-flop 212 is connected to a NAND gate 242 along with an inverted value of the SS 122. When the low value 304 is output on the SS 122, the address header 316 matches the address constant 230, and the eighth clock cycle 312 has been detected, the NAND gate 242 will have the high value 306 at two inputs resulting in the low value 304 output at the SSn 124.

When the high value 306 is output on the SS 122 by the master device 102, the SSn 124 output of the byte decoder 202 will also be forced into the high value 306. Further, when the high value 306 is output on the SS 122 by the master device 102 the shift register 204, the counter 206, and the flip-flop 212 are reset to their initial condition.

It is contemplated that each of the SSns 124 of the first slave device 106 of FIG. 1 could be coupled to or could themselves be outputs of the byte decoders 202. It is further contemplated that each of the byte decoders 202 could store a unique address for each of the pins outputting the SSn 124 of the first slave device 106.

It has been discovered that outputting the low value 304 on the SSn 124 after the address header 316 corresponding to one of the SSn 124 pins has been recognized and outputting the high value 306 on the SSn 124 when the high value 306 is output on the SS 122, allows the slave devices 104 to be directly connected with or without a wire or its functional equivalent to pins of the SSns 124 on the first slave device 106 without needing any additional intervening components thus reducing cost and complexity of implementation.

It has further been discovered that outputting the low value 304 on the SSn 124 after the address header 316 is decoded and is confirmed to correspond to one of the SSns 124 and outputting the high value 306 on the SSn 124 line when the SS 122 line carries the high value 306, allows the slave devices 104 to be connected only to the pins of the SSn 124 and not to the SS 122 pin of the master device 102 reducing the costs from additional circuitry and additional components.

Referring now to FIG. 3, therein is shown a timing diagram 302 for the byte decoder 202 of FIG. 2. The timing diagram 302 depicts the SS 122, the SCLK 116, and the MOSI 118 outputs of the master device 102 of FIG. 1. The timing diagram 302 is shown operating in a mode 0 having the SCLK 116 with a low idle at a low value 304 and active-high at a high value 306, and a clock phase where sampling of data occurs at odd edges 308.

The SCLK 116 is shown with three groups 310 of eight pulses, which end with an eighth clock cycle 312. The MOSI 118 is shown providing a data stream 314 having an address header 316 and a data portion 318. The data stream 314 can include the three groups 310 of 01010101, which corresponds to a hexadecimal value of 55.

The first group 310 of the SCLK 116 would be transmitted during the transmission of the address header 316. A signal 320 generated by the byte decoder 202 is shown as an output of the SSns 124 of the slave expander circuitry 108 of FIG. 1.

The signal 320 can be generated by the byte decoder 202 circuitry when decoding the address header 316 of the MOSI 118 and recognizing the address header 316 as corresponding to a pin of the SSns 124. Once the address header 316 is recognized as corresponding to a pin of the SSns 124, the low value 304 can be output on the corresponding SSn 124.

When the address header 316 of the MOSI 118 is detected as an address corresponding to one of the SSns 124, the proper SSn 124 will have the low value 304 output on a falling edge 322 of the last clock cycle for the address header 316. It is illustratively shown that the last clock cycle for the address header 316 is the eighth clock cycle 312.

When the low value 304 is output on the SSn 124 during the falling edge 322 of the last clock cycle of the address header 316, the next clock cycle of the SCLK 116 will appear to be the first clock cycle to the slave devices 104 of FIG. 1 activated by the low value 304 on the SSn 124. Further, the data portion 318 of the data stream 314 on the MOSI 118 will appear to be the first portions of the data stream 314 to the slave devices 104 activated by the low value 304 on the SSn 124.

The low value 304 remains output on the SSn 124 of the byte decoder 202 until the master device 102 outputs the high value 306 on the SS 122 allowing any number of bytes or any amount of data to be transmitted over the MOSI 118 or the MISO 120 of FIG. 1.

Figure 4:
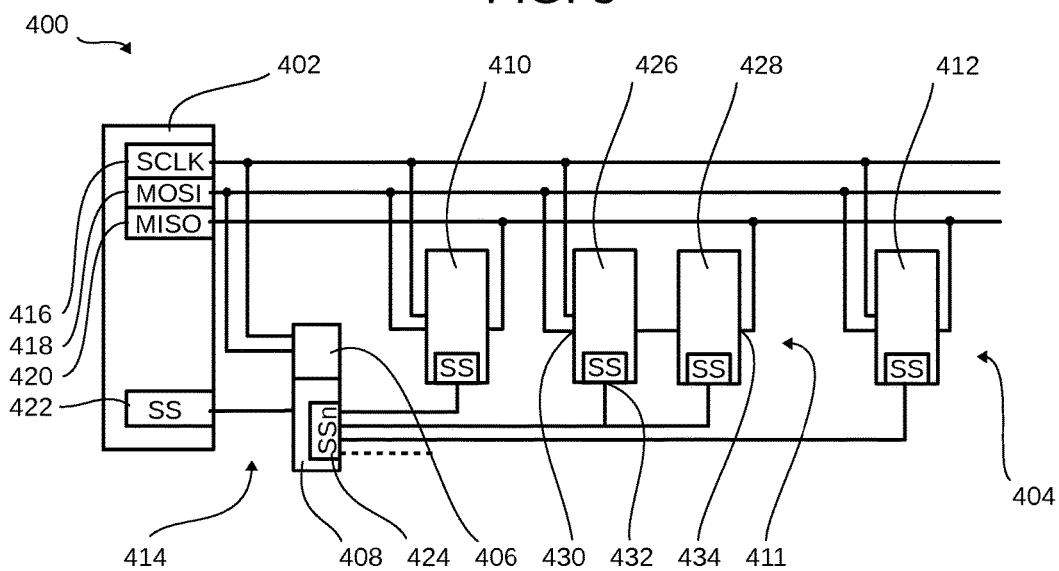
FIG. 4 is a block diagram of a serial peripheral interface system in a second embodiment.

Referring now to FIG. 4, therein is shown a block diagram of a serial peripheral interface system 400 in a second embodiment. The serial peripheral interface system 400 is depicted having a master device 402 and slave devices 404.

The serial peripheral interface system 400 of the present embodiment is similar to the serial peripheral interface system 100 of FIG. 1 in most respects with the exception of the arrangement of slave devices 404. The slave devices 404 can include multiple devices such as a first slave device 406 having slave expander circuitry 408, and can further include a second slave device 410, a group of slave devices depicted as daisy chained slave devices 411, and an $n^{th}$ slave device 412.

The master device 402 and the slave devices 404 are shown connected to an SPI bus 414. The SPI bus 414 can include an SCLK 416, a MOSI 418, a MISO 420, and an SS 422. The SCLK 416 and the MOSI 418 are outputs of the master device 402 and inputs to the first slave device 406, the second slave device 410, the daisy chained slave devices 411, and the $n^{th}$ slave device 412.

The MISO 420 is an input of the master device 402 and an output of the second slave device 410, the daisy chained slave devices 411, and the $n^{th}$ slave device 412. The SS 422 is an active low output of the master device 402 and an input to the first slave device 406.

The slave expander circuitry 408 of the first slave device 406 is depicted intercepting the SS 422 of the master device 402 and providing SSns 424 as outputs to the second slave device 410, the daisy chained slave devices 411, and the $n^{th}$ slave device 412. The SSns 424 can be active low outputs for asserting and activating the slave devices 404.

The second slave device 410 and the n$^{th}$ slave device 412 are configured to operate as independent slave devices. The SSns 424 from the slave expander circuitry 408 are depicted as unique lines for both the second slave device 410 and the n$^{th}$ slave device 412. Further, the SCLK 416, the MOSI 418, and the MISO 420 are directly connected to corresponding pins on the second slave device 410 and the n$^{th}$ slave device 412.

The daisy chained slave devices 411 are shown to include a first daisy chained device 426 and a second daisy chained device 428. The first daisy chained device 426 and the second daisy chained device 428 include MOSI inputs 430, SS inputs 432, and MISO outputs 434. The SS inputs 432 are coupled together and to the same SSn 424 from the slave expander circuitry 408.

Figure 6:
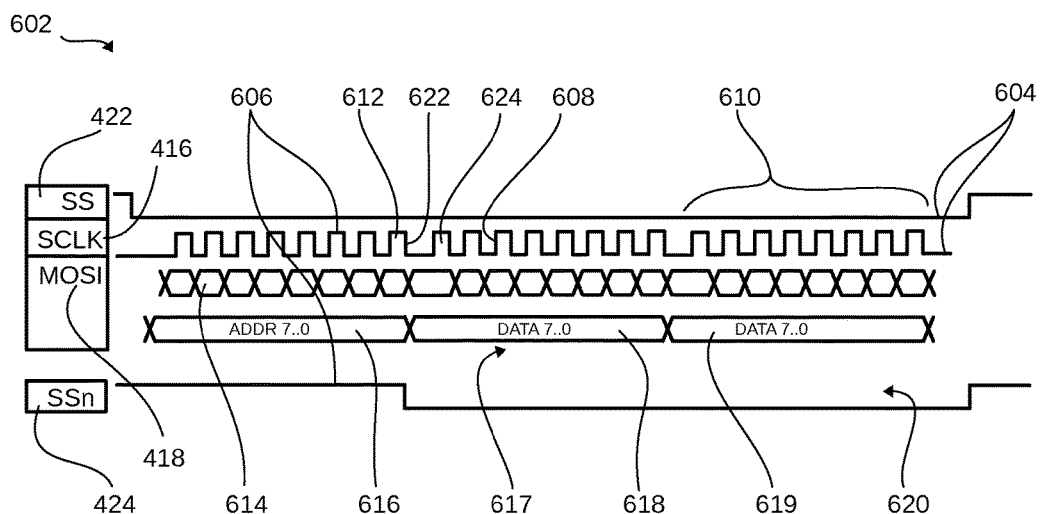
FIG. 6 is a timing diagram for the byte decoder of FIG. 5.

Coupling the SS inputs 432 of the first daisy chained device 426 and the second daisy chained device 428 allows the master device 402 to communicate with both the daisy chained devices 411 with a single address in the address header 616 of FIG. 6.

Further, the MOSI 418 of the SPI bus 414 is connected to the MOSI input 430 of the first daisy chained device 426, while the MISO output 434 of the first daisy chained device 426 is connected to the MOSI input 430 of the second daisy chained device 428. The MISO output 434 of the second daisy chained device 428 is connected to the MISO 420 the SPI bus 414.

It is contemplated that the first slave device 406, with the slave expander circuitry 408, could be implemented with a complex programmable logic device or a field-programmable gate array. It is further contemplated that the slave expander circuitry 408 could be implemented on a digital logic control block of an integrated circuit and functioning as a slave device 404.

The additional slave expander circuitry 408 of the first slave device 406 allows the other slave devices 404 to communicate with the master device 402 by providing the low value 604 of FIG. 6 on the SSn 424 corresponding and connected to a slave device 404 or group of slave devices 404 that is selected by the master device 402. It is contemplated that the master device 402 can output the low value 604 on the SS 422 and can provide the data stream 614 of FIG. 6 on the MOSI 418.

An initial portion of the data stream 614 can be the address header 616 of FIG. 6. The address header 616 can identify one or a group of the slave devices 404. Communication can be enabled between the master device 402 and the slave devices 404 once the address header 616 is decoded and identifies the slave devices 404. The address header 616 is described as being 1 byte long; however it is contemplated that the address header 616 could be longer or shorter.

Figure 5:
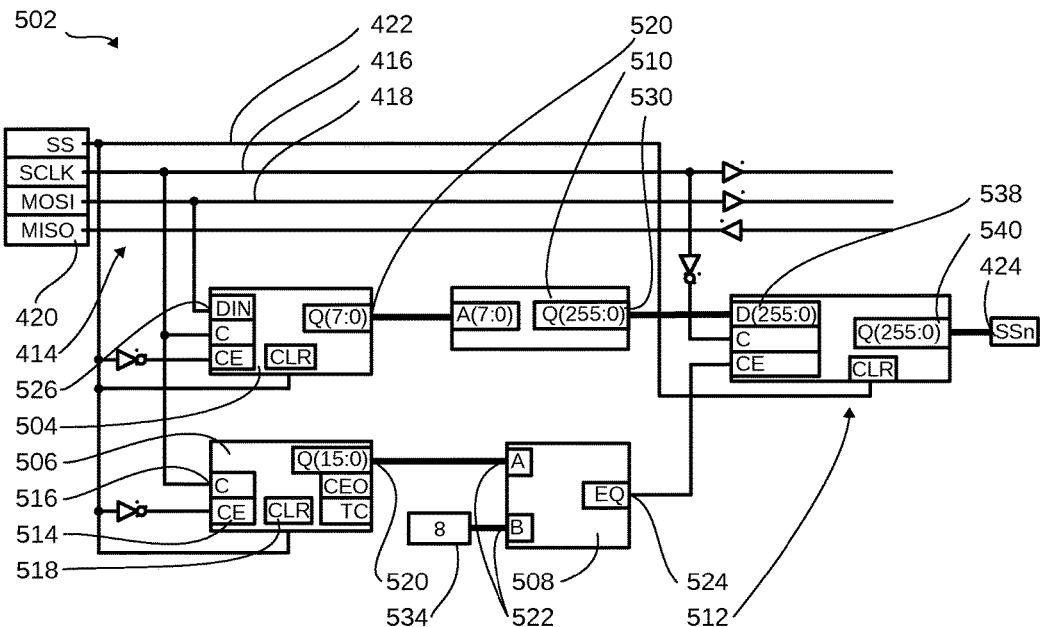
FIG. 5 is a schematic view of a byte decoder in the slave expander circuitry of FIG. 4.

The slave expander circuitry 408 can include the byte decoders 502 of FIG. 5. The byte decoders 502 can decode the address header 616 of the data stream 614 from the MOSI 418 of the master device 402.

The first slave device 406, having the slave expander circuitry 408, can then output the low value 604 on the SSn 424 corresponding to the slave devices 404 identified by the address header 616 before a data portion 617 of FIG. 6 of the data stream 614 arrives.

Once the low value 604 is output on the SSn 424 corresponding to the slave devices 404 identified by the address header 616, the master device 402 will communicate directly with the slave devices 404 identified by the address header 616 via the MOSI 418 and the MISO 420. Once the master device 402 outputs the high value 606 of FIG. 6 on the SS 422, the first slave device 406 will output the high value 606 on the SSn 424 corresponding to the slave devices 404 identified by the address header 616.

Alternatively, it is contemplated that the first slave device 406 could be the slave device 404 identified by the address header 616. When the first slave device 406 is identified, the slave expander circuitry 408 of the first slave device 406 would not output the low value 604 on the SSns 424 unless the first slave device 406 is daisy chained to other slave devices 404. When the first slave device 406 is part of a daisy chain, the first slave device 406 will output the low value 604 on the SSns 424 corresponding to the other slave devices 404 in the daisy chain.

It has been discovered that implementing the slave expander circuitry 408 within the first slave device 406 of the serial peripheral interface system 400 allows the master device 402 to communicate with the slave devices 404 identified by the address header 616 while the slave expander circuitry 408 appears completely transparent after the initial address header 616. It has further been discovered that implementing the slave expander circuitry 408 within the first slave device 406 of the serial peripheral interface system 400 allows a large number of dissimilar slave devices 404 to share a single SPI bus 414.

It has been further discovered that the slave expander circuitry 408 could be implemented as an additional feature to existing serial peripheral interface products. As an illustrative example, a slave device such as a DAC could utilize additional pins and allow a designer to expand an existing SPI bus 414 for use with other slave devices 404 providing a high degree of design flexibility in situations where the master device 402 is fixed or limited, such as a low end microprocessor or a universal serial bus host adapter.

Although the slave expander circuitry 408 is depicted as internal to the first slave device 406, it is contemplated that the slave expander circuitry 408 could be implemented as a feature to serial peripheral interface port expanders. The slave expander circuitry 408 would allow a serial peripheral interface port expander to be inserted between an existing master device 402 and slave device pair, providing not only additional inputs and outputs but also support for additional slaves to a designer without needing to add to the master device 402's capabilities.

Referring now to FIG. 5, therein is shown a schematic view of a byte decoder 502 in the slave expander circuitry 408 of FIG. 4. The byte decoder 502 is depicted as a single byte decoder 502 capable of decoding the address header 616 of FIG. 6 for multiple addresses corresponding to groups or individual slave devices 404 of FIG. 4. It is yet further contemplated that the byte decoder 502 could be implemented in other variations of hardware or software without departing from the serial peripheral interface system 400 of FIG. 4.

The byte decoder 502 is depicted being connected to the SS 422, the SCLK 416, and the MOSI 418 of the SPI bus 414 of FIG. 4. Further the byte decoder 502 is shown having the SSns 424 as outputs.

The byte decoder 502 can include a shift register 504 and a counter 506 connected to the SS 422, and the SCLK 416 of the SPI bus 414. The shift register 504 can be an address receiver and can further be connected to the MOSI 418 of the SPI bus 414. The counter 506 can be connected to a count comparator 508 while the shift register 504 can be connected to a decoder 510.

The count comparator 508 and the decoder 510 can be connected to a flip-flop 512, which can be connected to the SS 422 and the SCLK 416 of the SPI bus 414. The shift register 504, the counter 506, and the flip-flop 512 are depicted having inputs including a clock enable 514, a clock input 516, and a clear 518. The shift register 504, the counter 506, and the decoder 510 can have parallel outputs 520.

The parallel outputs 520 of the shift register 504 and the counter 506 can be coupled to parallel inputs 522 of the count comparator 508 and the decoder 510. For descriptive clarity, the parallel outputs 520 and parallel inputs 522 are shown connected with thicker lines indicating a bus as are other busses within the byte decoder 502 with the exception of the SPI bus 414, which has been broken out. The count comparator 508 can also include equal outputs 524.

The shift register 504 can be a serial-in parallel-out shift register. When the low value 604 of FIG. 6 is output on the SS 422 by the master device 402 of FIG. 4, the shift register 504 will be enabled with an inverted value of the SS 422 on the clock enable 514 and the low value 604 from the SS 422 on the clear 518. Once enabled, the shift register 504 will shift the address header 616 from a serial input 526 and provide the address header 616 as the parallel output 520.

The address header 616 on the parallel output 520 of the shift register 504 is then decoded and asserts one pin from an output array 530 connected to the flip-flop 512. Illustratively, when the address header 616 is eight bits long the output array 530 could be two hundred fifty-six outputs large. The pin asserted on the output array 530 can correspond to or identify one or a group of the slave devices 404. The pin asserted on the output array 530 can also correspond to or identify one of the SSns 424.

The counter 506 can be a cascadable binary counter. When the low value 604 is output on the SS 422 by the master device 402, the counter 506 will be enabled with an inverted value of the SS 422 on the clock enable 514 and the low value 604 on the clear 518. Once enabled, the counter 506 will provide a count incremented during low-to-high clock transitions of the SCLK 416 provided at the clock input 516.

The counter 506 can provide the parallel output 520 of the count. The parallel output 520 of the counter 506 is then compared with a count constant 534 on the count comparator 508. The count comparator 508 can be a sixteen bit identity comparator. When the parallel output 520 of the counter 506 is identical to the count constant 534, the high value 606 will be output on the equal output 524 of the count comparator 508.

The count constant 534 can be a hexadecimal count of eight representing the eighth clock cycle 612 of FIG. 6 of the SCLK 416. The flip-flop 512 can be a D flip-flop with clock enable and asynchronous clear. The equal output 524 of the count comparator 508 can be connected to the clock enable 514 of the flip-flop 512. The output array 530 of the decoder 510 can be connected to a D input 538 of the flip-flop 212.

When the high value 606 is output by the master device 402 on the SS 422, the clear 518 on the flip-flop 512 is asserted and an output 540 of the flip-flop 512 is set to 0. Otherwise, when the low value 604 is output on the SS 422, the clock enable 514 of the flip-flop 512 is examined during the low-to-high transition of the SCLK 416 at the clock input 516.

If the clock enable 514 of the flip-flop 512 is asserted by the equal output 524 of the count comparator 508, the data on an input 538 of the flip-flop 512 from the decoder 510, is loaded to the output 540 of the flip-flop 512; otherwise, the output 540 of the flip-flop 512 retains its previous value.

When the SCLK 416 reaches the eighth clock cycle 612, the count comparator 508 will output the high value 606 at the clock enable 514 of the flip-flop 512 after the rising edge of the eighth clock cycle 612 until the rising edge of a ninth clock cycle 624. Providing the high value 606 at one of the two hundred and fifty-six select lines from the output array 530 of the decoder 510 on the D input 538 of the flip-flop 512 and the high value 606 at the clock enable 514 of the flip-flop 512 will result in the flip-flop 512 latching to the high value 606 at the output 540 on the falling edge 622 of FIG. 6 of the eighth clock cycle 612 and asserting the selected SSn 424 to the addressed slave device 404.

When the high value 606 is output on the SS 422 by the master device 402, the SSn 424 output of the byte decoder 502 will also be forced into the high value 606. Further, when the high value 606 is output on the SS 422 by the master device 402, the shift register 504, the counter 506, and the flip-flop 512 are reset to their initial condition.

It is contemplated that each of the SSns 424 of the first slave device 406 of FIG. 4 could be coupled to or could themselves be outputs of the byte decoders 502. It has been discovered that outputting the low value 604 on the SSn 424 after the address header 616 corresponding to one of the SSn 424 pins has been recognized and outputting the high value 606 on the SSn 424 when the SS 422 line carries the high value 606, allows the slave devices 404 to be directly connected with or without a wire or its functional equivalent to pins of the SSns 424 on the first slave device 406 without needing any additional intervening components thus reducing cost and complexity of implementation.

It has further been discovered that outputting the low value 604 on the SSn 424 after the address header 616 is decoded and is confirmed to correspond to one of the SSns 424 and outputting the high value 606 on the SSn 424 line when the SS 422 line carries the high value 606, allows the slave devices 404 to be connected only to the pins of the SSn 424 and not to the SS 422 pin of the master device 402 reducing the costs from additional circuitry and additional components.

Referring now to FIG. 6, therein is shown a timing diagram 602 for the byte decoder 502 of FIG. 5. The timing diagram 602 depicts the SS 422, the SCLK 416, and the MOSI 418 outputs of the master device 402 of FIG. 4. The timing diagram 602 is shown operating in a mode 0 having the SCLK 416 with a low idle at a low value 604 and active-high at a high value 606, and a clock phase where sampling of data occurs at odd edges 608 such as the first, third, and fifth edges.

The SCLK 416 is shown with three groups 610 of eight pulses, which end with an eighth clock cycle 612. The MOSI 418 is shown providing a data stream 614 having an address header 616 and a data portion 617. The data portion 617 of the data stream 614 can be data such as a first data byte 618, a second data byte 619, along with more data depending on the operation of the slave devices 404 of FIG. 4.

The first group 610 of the SCLK 416 would be transmitted during the transmission of the address header 616. A signal 620 generated by the byte decoder 502 is shown as an output of the SSns 424 of the slave expander circuitry 408 of FIG. 4.

The signal 620 can be generated by the byte decoder 502 circuitry when decoding the address header 616 of the MOSI 418 and recognizing the address header 616 as corresponding to one pin from the output array 530 of FIG. 5. Once the address header 616 is recognized as corresponding to a pin from the output array 530, the low value 604 can be output on the corresponding SSn 424 during a falling edge 622 of the eighth clock cycle 612.

When the low value 604 is output on the SSn 424 during the falling edge 622 of the last clock cycle of the address header 616, the next clock cycle of the SCLK 416 will appear to be the first clock cycle to the slave devices 404 activated by the low value 604 on the SSn 424. Further, the data portion 617 of the data stream 614 on the MOSI 418 will appear to be the first portions of the data stream 614 to the slave devices 404 activated by the low value 604 on the SSn 424.

The low value 604 remains output on the SSn 424 of the byte decoder 502 until the master device 402 outputs the high value 606 on the SS 422 allowing any number of bytes or any amount of data to be transmitted over the MOSI 418 or the MISO 420 of FIG. 4.

Figure 7:
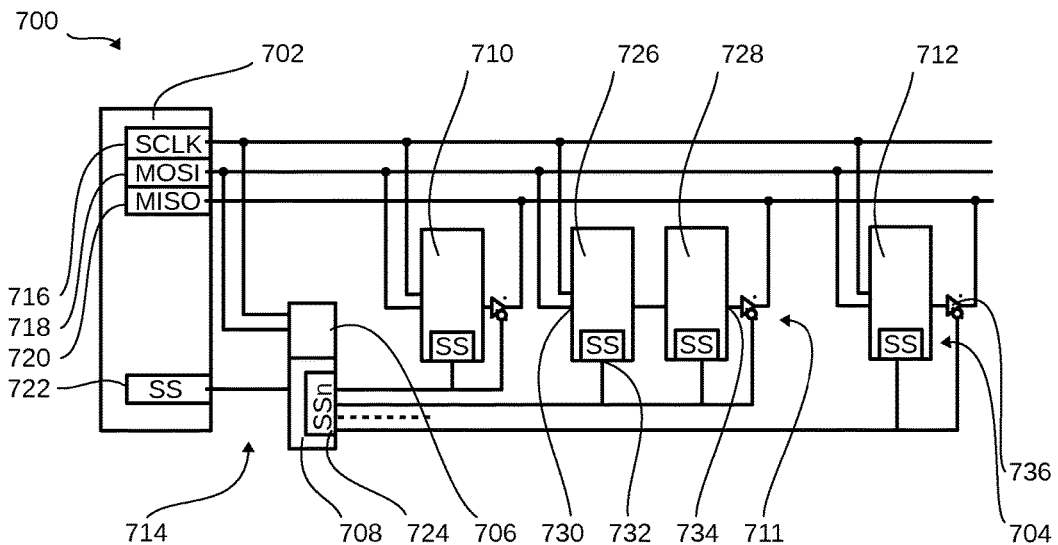
FIG. 7 is a block diagram of a serial peripheral interface system in a third embodiment.

Referring now to FIG. 7, therein is shown a block diagram of a serial peripheral interface system 700 in a third embodiment. The serial peripheral interface system 700 is depicted having a master device 702 and slave devices 704.

The serial peripheral interface system 700 of the present embodiment is similar to the serial peripheral interface system 400 of FIG. 4 in most respects. The slave devices 704 can include multiple devices such as a first slave device 706 having slave expander circuitry 708, and can further include a second slave device 710, a group of slave devices depicted as daisy chained slave devices 711, and an $n^{th}$ slave device 712.

The master device 702 and the slave devices 704 are shown connected to an SPI bus 714. The SPI bus 714 can include an SCLK 716, a MOSI 718, a MISO 720, and an SS 722. The SCLK 716 and the MOSI 718 are outputs of the master device 702 and inputs to the first slave device 706, the second slave device 710, the daisy chained slave devices 711, and the $n^{th}$ slave device 712.

The MISO 720 is an input of the master device 702 and an output of the second slave device 710, the daisy chained slave devices 711, and the $n^{th}$ slave device 712. The SS 722 is an active low output of the master device 702 and an input to the first slave device 706.

The slave expander circuitry 708 of the first slave device 706 is depicted intercepting the SS 722 of the master device 702 and providing SSns 724 as outputs to the second slave device 710, the daisy chained slave devices 711, and the $n^{th}$ slave device 712. The SSns 724 can be active low outputs for asserting and activating the slave devices 704.

The second slave device 710 and the $n^{th}$ slave device 712 are configured to operate as independent slave devices. The SSns 724 from the slave expander circuitry 708 are depicted as unique lines for both the second slave device 710 and the $n^{th}$ slave device 712. Further, the SCLK 716, the MOSI 718, and the MISO 720 are directly connected to corresponding pins on the second slave device 710 and the $n^{th}$ slave device 712.

The daisy chained slave devices 711 are shown to include a first daisy chained device 726 and a second daisy chained device 728. The first daisy chained device 726 and the second daisy chained device 728 include MOSI inputs 730, SS inputs 732, and MISO outputs 734. The SS inputs 732 are coupled together and to the same SSn 724 from the slave expander circuitry 708.

Figure 9:
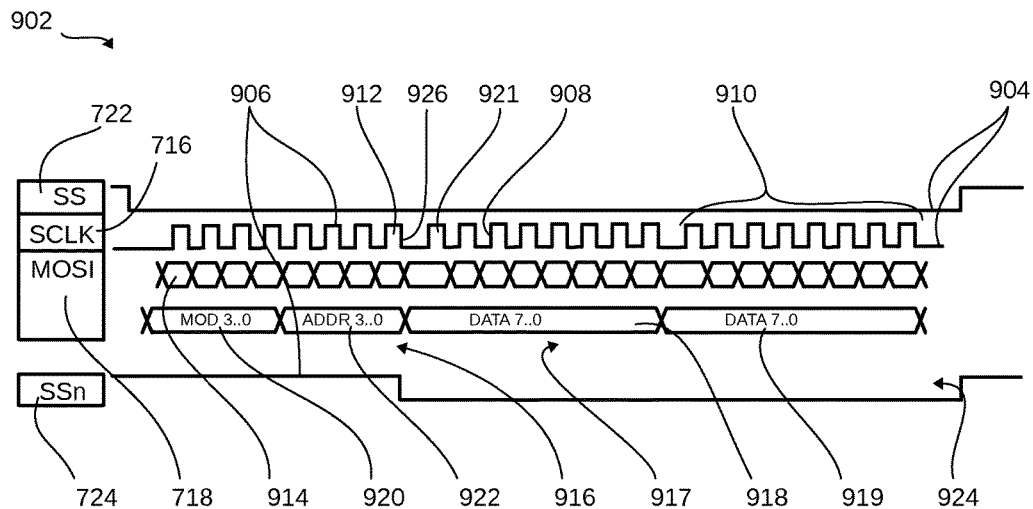
FIG. 9 is a timing diagram for the byte decoder of FIG. 8.

Coupling the SS inputs 732 of the first daisy chained device 726 and the second daisy chained device 728 allows the master device 702 to communicate with both the daisy chained devices 711 with a single address in the address header 916 of FIG. 9.

Further, the MOSI 718 of the SPI bus 714 is connected to the MOSI input 730 of the first daisy chained device 726, while the MISO output 734 of the first daisy chained device 726 is connected to the MOSI input 730 of the second daisy chained device 728. The MISO output 734 of the second daisy chained device 728 is connected to the MISO 720 the SPI bus 714.

It is contemplated that the first slave device 706, with the slave expander circuitry 708, could be implemented with a complex programmable logic device or a field-programmable gate array. It is further contemplated that the slave expander circuitry 708 could be implemented on a digital logic control block of an integrated circuit and functioning as a slave device 704. It is yet further contemplated that the slave expander circuitry 708 could be implemented in multiple slave devices 704.

The additional slave expander circuitry 708 of the first slave device 706 allows the other slave devices 704 to communicate with the master device 702 by providing the low value 904 of FIG. 9 on the SSn 724 corresponding and connected to a slave device 704 or group of slave devices 704 when the first slave device 706 having the slave expander circuitry 708 is selected and another one of the slave devices 704 is selected by the master device 702. It is contemplated that the master device 702 can output the low value 904 on the SS 722 and can provide the data stream 914 of FIG. 9 on the MOSI 718.

An initial portion of the data stream 914 can be the address header 916 of FIG. 9. The address header 916 can identify the slave device 704 having the slave expander circuitry 708 along with one or a group of the slave devices 704. Communication can be enabled between the master device 702 and the slave devices 704 once the address header 916 is decoded and identifies the slave devices 704. The address header 916 is described as being 1 byte long; however it is contemplated that the address header 916 could be longer or shorter.

Figure 8:
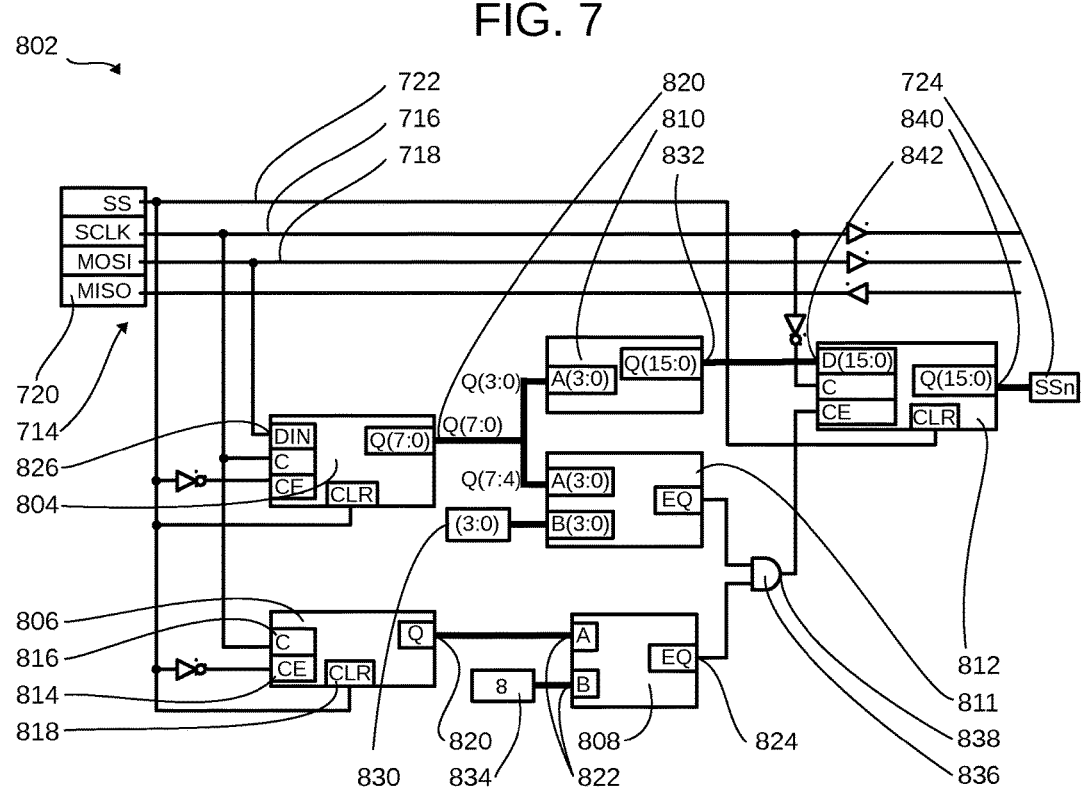
FIG. 8 is a schematic view of a byte decoder in the slave expander circuitry of FIG. 7.

The slave expander circuitry 708 can include the byte decoders 802 of FIG. 8. The byte decoders 802 can decode the address header 916 of the data stream 914 from the MOSI 718 of the master device 702.

If the first slave device 706, having the slave expander circuitry 708, is selected and another slave device 704 connected thereto is selected, the first slave device can then output the low value 904 on the SSn 724 corresponding to the slave devices 704 identified by the address header 916 before a data portion 917 of FIG. 9 of the data stream 914 arrives.

Once the low value 904 is output on the SSn 724 corresponding to the slave devices 704 identified by the address header 916, the master device 702 will communicate directly with the slave devices 704 identified by the address header 916 via the MOSI 718 and the MISO 720.

The connection between the MISO 720 of the SPI bus 714 and the MISO output 734 of the slave devices 704 is buffered by tristate buffers 736. The tristate buffers 736 could be used for full duplex operation in cases where the slave devices 704 do not tristate their MISO output 734 when not selected. A bus switch would be used when MOSI input 730 and MISO output 734 are tied together on the slave devices 704.

The serial peripheral interface system 700 of the present embodiment is further contemplated to be implemented with the slave devices 704 being grouped as modules such as with ATE load boards. It is contemplated that the slave expander circuitry 708 could be implemented into instrumentation modules that decode an address corresponding to the SSns 724 for both a module and internal slave devices 704, allowing many modules with many slaves to share the same SPI bus 714.

Illustratively, the first slave device 706 having slave expander circuitry 708, the second slave device 710, the group of slave devices depicted as daisy chained slave devices 711, and the $n^{th}$ slave device 712 could be grouped into a module. The address header 916 from the MOSI 718 could first identify the first slave device 706 with the slave expander circuitry 708 then could identify the second slave device 710, the group of slave devices depicted as daisy chained slave devices 711, or the $n^{th}$ slave device 712.

Once the master device 702 outputs the high value 906 of FIG. 9 on the SS 722, the first slave device 706, if selected, will output the high value 906 on the SSn 724 corresponding to the slave devices 704 identified by the address header 916.

It has been discovered that implementing the slave expander circuitry 708 within the first slave device 706 of the serial peripheral interface system 700 and grouping the slave devices 704 together in modules allows the master device 702 to communicate with the slave devices 704 identified by the address header 916 while the slave expander circuitry 708 appears completely transparent after the initial address header 916. It has further been discovered that implementing the slave expander circuitry 708 within the first slave device 706 of the serial peripheral interface system 700 allows a large number of dissimilar slave devices 704 to share a single SPI bus 714.

Referring now to FIG. 8, therein is shown a schematic view of a byte decoder 802 in the slave expander circuitry 708 of FIG. 7. The byte decoder 802 is depicted as a single byte decoder 802 capable of decoding the address header 916 of FIG. 9 for multiple addresses corresponding to groups or individual slave devices 704 of FIG. 7. It is yet further contemplated that the byte decoder 802 could be implemented in other variations of hardware or software without departing from the serial peripheral interface system 700 of FIG. 7.

The byte decoder 802 is depicted being connected to the SS 722, the SCLK 716, and the MOSI 718 of the SPI bus 714 of FIG. 7. Further the byte decoder 802 is shown having the SSns 724 as outputs.

The byte decoder 802 can include a shift register 804 and a counter 806 connected to the SS 722, and the SCLK 716 of the SPI bus 714. The shift register 804 can be an address receiver and can further be connected to the MOSI 718 of the SPI bus 714. The counter 806 can be connected to a count comparator 808 while the shift register 804 can be connected to a decoder 810 and to an address comparator 811.

The count comparator 808, the address comparator 811, and the decoder 810 can be connected to a flip-flop 812, which can be connected to the SS 722 and the SCLK 716 of the SPI bus 714.

The shift register 804, the counter 806, and the flip-flop 812 are depicted having inputs including a clock enable 814, a clock input 816, and a clear 818. The shift register 804, the counter 806, and the decoder 810 can have parallel outputs 820.

The parallel outputs 820 of the shift register 804 and the counter 806 can be coupled to parallel inputs 822 of the count comparator 808, the address comparator 811, and the decoder 810. For descriptive clarity, the parallel outputs 820 and parallel inputs 822 are shown connected with thicker lines indicating a bus as are other busses within the byte decoder 802 with the exception of the SPI bus 714, which has been broken out. The count comparator 808 and the address comparator 811 can also include equal outputs 824.

The shift register 804 can be a serial-in parallel-out shift register. When the low value 904 of FIG. 9 is output on the SS 722 by the master device 702 of FIG. 7, the shift register 804 will be enabled with an inverted value of the SS 722 on the clock enable 814 and the low value 904 from the SS 722 on the clear 818. Once enabled, the shift register 804 will shift the address header 916 from a serial input 826 and provide the address header 916 as the parallel output 820.

The address header 916 on the parallel output 820 of the shift register 804 can contain two addresses such as a module address 920 of FIG. 9 and a slave address 922 of FIG. 9. The module address 920 can be the first portion or first four bits of an address corresponding to the slave expander circuitry 708 while the slave address 922 can be the data portion or second four bits of an address header 916 corresponding to the slave devices 704 selected by the master and connected to the first slave device 706 of FIG. 7.

The parallel output 820 of the shift register 804 can be connected to the address comparator 811. The module address 920 portion of the address header 916 on the parallel output 820 of the shift register 804 can be compared to an address constant 830 with the address comparator 811.

The address comparator 811 can be a four bit identity comparator. When the module address 920 portion of the address header 916 at the parallel output 820 of the shift register 804 is identical to the address constant 830, the high value 906 of FIG. 9 will be output on the equal output 824 of the address comparator 811. The address constant 830 input of the address comparator 811 can be a hexadecimal address corresponding or identifying the slave expander circuitry 708 within one of the slave devices 704.

The slave address 922 portion of the address header 916 can then be decoded within the decoder 810. Once decoded, the decoder 810 can assert one pin from an output array 832 connected to the flip-flop 812.

Illustratively, when the slave address 922 portion of the address header 916 is four bits long the output array 832 could be sixteen outputs large. The pin asserted on the output array 832 can correspond to or identify one or a group of the slave devices 704 within a module. The pin asserted on the output array 832 can also correspond to or identify one of sixteen SSns 724.

It has been discovered that enabling the use of the module address 920 and the slave address 922 portions of the address header 916 enables the serial peripheral interface system 700 to use multiple slave expanders with a single master device. This is particularly useful for controlling multiple modules, with each using an SPI slave expander controlling multiple slave devices.

The counter 806 can be a cascadable binary counter. When the low value 904 is output on the SS 722 by the master device 702, the counter 806 will be enabled with an inverted value of the SS 722 on the clock enable 814 and the low value 904 on the clear 818. Once enabled, the counter 806 will provide a count incremented during low-to-high clock transitions of the SCLK 716 provided at the clock input 816.

The counter 806 can provide the parallel output 820 of the count. The parallel output 820 of the counter 806 is then compared with a count constant 834 on the count comparator 808. The count comparator 808 can be a sixteen bit identity comparator. When the parallel output 820 of the counter 806 is identical to the count constant 834, the high value 906 will be output on the equal output 824 of the count comparator 808.

The count constant 834 can be a hexadecimal count of eight representing the eighth clock cycle 912 of FIG. 9 of the SCLK 716. The flip-flop 812 can be a D flip-flop with clock enable and asynchronous clear. The equal output 824 of the count comparator 808 and the equal output 824 of the address comparator 811 can be connected to an and gate 836, an output 838 of the and gate 836 can be connected to the clock enable 814 of the flip-flop 812.

When the address comparator 811 identifies the module address 920 portion of the address header 916 as matching the address constant 830, the address comparator 811 will output the high value 906 at the equal output 824. When the count comparator 808 identifies the parallel output 820 of the counter 806 as matching the count constant 834, the count comparator 808 will output the high value 906 at the equal output 824.

When the high value 906 is output by the master device 702 on the SS 722, the clear 818 on the flip-flop 812 is asserted and an output 840 of the flip-flop 812 is set to 0. Otherwise, when the low value 904 is output on the SS 722, the clock enable 814 of the flip-flop 812 is examined during the low-to-high transition of the SCLK 716 at the clock input 816.

When the equal outputs 824 from the count comparator 808 and the address comparator 811 are the high value 906, the and gate 836 will output the high value 906 on the clock enable 814 of the flip-flop 812. If the clock enable 814 of the flip-flop 812 is asserted by the and gate 836, the data on an input 842 of the flip-flop 812 from the decoder 810, is loaded to the output 840 of the flip-flop 812; otherwise, the output 840 of the flip-flop 812 retains its previous value.

When the SCLK 716 reaches the eighth clock cycle 912, the count comparator 808 will output the high value 906 to the and gate 836 after the rising edge of the eighth clock cycle 912 until the rising edge of a ninth clock cycle 921. If the equal output 824 of the address comparator 811 is also the high value 906 from detecting a match between the address constant 830 and the module address 920 portion of the address header 916, the and gate 836 will output the high value 906 at the clock enable 814 of the flip-flop 812.

Providing the high value 906 at one of the sixteen select lines from the output array 832 of the decoder 810 on the input 842 of the flip-flop 812 and the high value 906 at the clock enable 814 of the flip-flop 812 will result in the flip-flop 812 latching to the high value 906 at the output 840 of the flip-flop 812 on the falling edge 926 of FIG. 9 of the eighth clock cycle 912 of the SCLK 716 and asserting the selected SSn 724 to the addressed slave device 704.

When the high value 906 is output on the SS 722 by the master device 702, the SSn 724 output of the byte decoder 802 will also be forced into the high value 906. Further, when the high value 906 is output on the SS 722 by the master device 702 the shift register 804, the counter 806, and the flip-flop 812 are reset to their initial condition.

It is contemplated that each of the SSns 724 of the first slave device 706 could be coupled to or could themselves be outputs of the byte decoders 802. It has been discovered that outputting the low value 904 on the SSn 724 after the address header 916 corresponding to one of the SSn 724 pins has been recognized and outputting the high value 906 on the SSn 724 when the SS 722 line carries the high value 906, allows the slave devices 704 to be directly connected with or without a wire or its functional equivalent to pins of the SSns 724 on the first slave device 706 without needing any additional intervening components thus reducing cost and complexity of implementation.

It has further been discovered that outputting the low value 904 on the SSn 724 after the address header 916 is decoded and is confirmed to correspond to one of the SSns 724 and outputting the high value 906 on the SSn 724 line when the SS 722 line carries the high value 906, allows the slave devices 704 to be connected only to the pins of the SSn 724 and not to the SS 722 pin of the master device 702 reducing the costs from additional circuitry and additional components.

Referring now to FIG. 9, therein is shown a timing diagram 902 for the byte decoder 802 of FIG. 8. The timing diagram 902 depicts the SS 722, the SCLK 716, and the MOSI 718 outputs of the master device 702 of FIG. 7. The timing diagram 902 is shown operating in a mode 0 having the SCLK 716 with a low idle at a low value 904 and active-high at a high value 906, and a clock phase where sampling of data occurs at odd edges 908 such as the first, third, and fifth edges.

The SCLK 716 is shown with three groups 910 of eight pulses, which end with an eighth clock cycle 912. The MOSI 718 is shown providing a data stream 914 having an address header 916 and a data portion 917. The data portion 917 of the data stream 914 can be data such as a first data byte 918, a second data byte 919, along with more data depending on the operation of the slave devices 704 of FIG. 7.

The first group 910 of the SCLK 716 would be transmitted during the transmission of the address header 916. The address header 916 can include two portions, a module address 920 and a slave address 922. The module address 920 can correspond to the address of the slave device 704 having the slave expander circuitry 708 of FIG. 7 or can correspond to the address of the slave expander circuitry 708 itself.

The module address 920 is depicted as the first group of four bits out of an eight bit length of the address header 916. The slave address 922 can correspond to the address of one or a group of the slave devices 704. Alternatively, the slave address 922 can correspond to the address of one of the SSns 724.

The slave address 922 is depicted as the second group of four bits out of the eight bit length of the address header 916. A signal 924 generated by the byte decoder 802 is shown as an output of the SSns 724 of the slave expander circuitry 708.

The signal 924 can be generated by the byte decoder 802 after the module address 922 is confirmed to match the address constant 830 of FIG. 8 and then after decoding the slave address 922 portion of the address header 916 and recognizing the address portion 922 as corresponding to one pin from the output array 832 of FIG. 8. Once the module address 920 is recognized as corresponding to the address of the slave expander circuitry 708 and the slave address 922 is recognized as corresponding to a pin from the output array 832, the low value 904 can be output on the corresponding SSn 724 during a falling edge 926 of the eighth clock cycle 912.

When the low value 904 is output on the SSn 724 during the falling edge 926 of the last clock cycle of the address header 916, the next clock cycle of the SCLK 716 will appear to be the first clock cycle to the slave devices 704 activated by the low value 904 on the SSn 724. Further, the data portion 917 of the data stream 914 on the MOSI 718 will appear to be the first portions of the data stream 914 to the slave devices 704 activated by the low value 904 on the SSn 724.

The low value 904 remains output on the SSn 724 of the byte decoder 802 until the master device 702 outputs the high value 906 on the SS 722 allowing any number of bytes or any amount of data to be transmitted over the MOSI 718 or the MISO 720 of FIG. 7.

Figure 10:
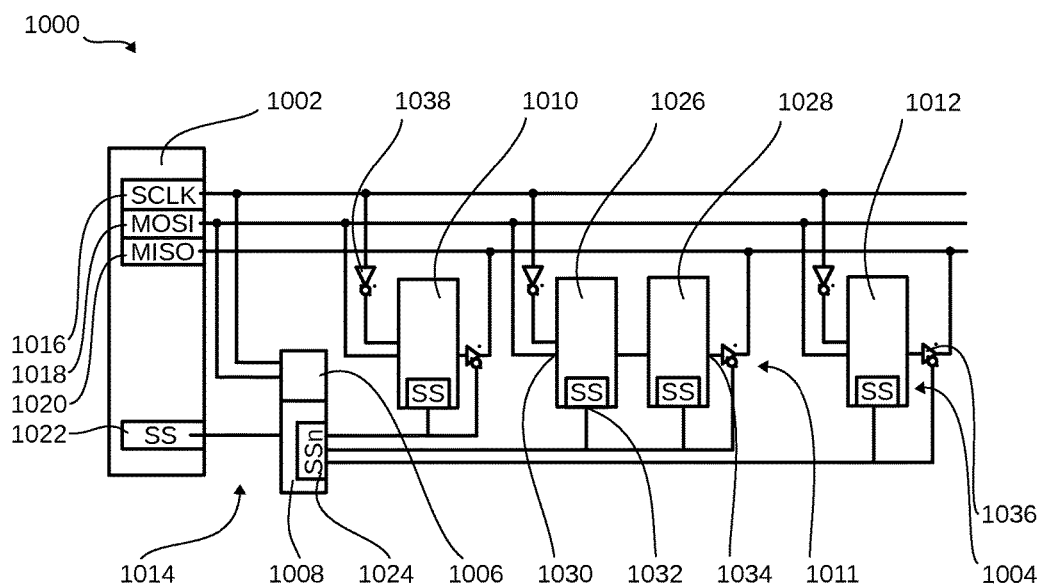
FIG. 10 is a block diagram of a serial peripheral interface system with multiple mode accommodation in a fourth embodiment.

Referring now to FIG. 10, therein is shown a block diagram of a serial peripheral interface system 1000 with multiple mode accommodation in a fourth embodiment. For descriptive clarity elements found in both FIG. 11 and FIG. 12 referenced in the description of FIG. 10 will be described from both FIG. 11 and FIG. 12 during the first use and FIG. 11 in all subsequent uses unless modes 1 and 3 are specifically being discussed, in which case elements from FIG. 12 will be referenced.

The serial peripheral interface system 1000 is depicted having a master device 1002 and slave devices 1004. The slave devices 1004 can include multiple devices such as a first slave device 1006 having slave expander circuitry 1008, and can further include a second slave device 1010, a group of slave devices depicted as daisy chained slave devices 1011, and an $n^{th}$ slave device 1012.

The master device 1002 and the slave devices 1004 are shown connected to an SPI bus 1014. The SPI bus 1014 can include an SCLK 1016, a MOSI 1018, a MISO 1020, and an SS 1022. The SCLK 1016 and the MOSI 1018 are outputs of the master device 1002 and inputs to the first slave device 1006, the second slave device 1010, the daisy chained slave devices 1011, and the $n^{th}$ slave device 1012.

The MISO 1020 is an input of the master device 1002 and an output of the second slave device 1010, the daisy chained slave devices 1011, and the $n^{th}$ slave device 1012. The SS 1022 is shown as an active low output of the master device 1002 enabling negative logic and as an input to the first slave device 1006.

The slave expander circuitry 1008 of the first slave device 1006 is depicted intercepting the SS 1022 of the master device 1002 and providing SSns 1024 as outputs to the second slave device 1010, the daisy chained slave devices 1011, and the $n^{th}$ slave device 1012. The SSns 1024 can be active low outputs for asserting and activating the slave devices 1004.

The second slave device 1010 and the $n^{th}$ slave device 1012 are configured to operate as independent slave devices. The SSns 1024 from the slave expander circuitry 1008 are depicted as unique lines for both the second slave device 1010 and the $n^{th}$ slave device 1012. Further, the SCLK 1016, the MOSI 1018, and the MISO 1020 are directly connected to corresponding pins on the second slave device 1010 and the $n^{th}$ slave device 1012.

The daisy chained slave devices 1011 are shown to include a first daisy chained device 1026 and a second daisy chained device 1028. The first daisy chained device 1026 and the second daisy chained device 1028 include MOSI inputs 1030, SS inputs 1032, and MISO outputs 1034. The SS inputs 1032 are coupled together and to the same SSn 1024 from the slave expander circuitry 1008.

Figure 11:
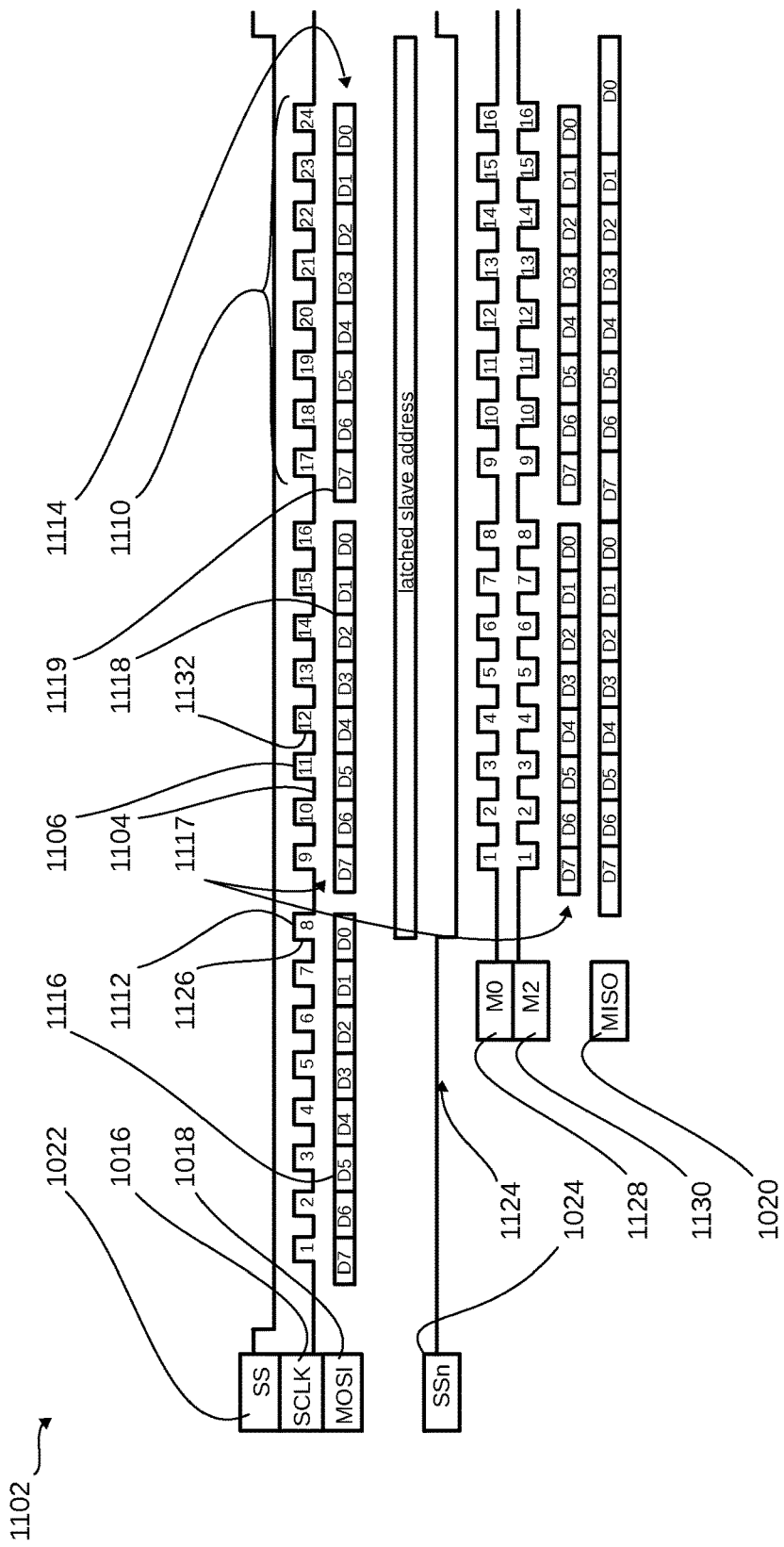
FIG. 11 is a timing diagram for the serial peripheral interface system of FIG. 10 in a mode 0 configuration.
Figure 12:
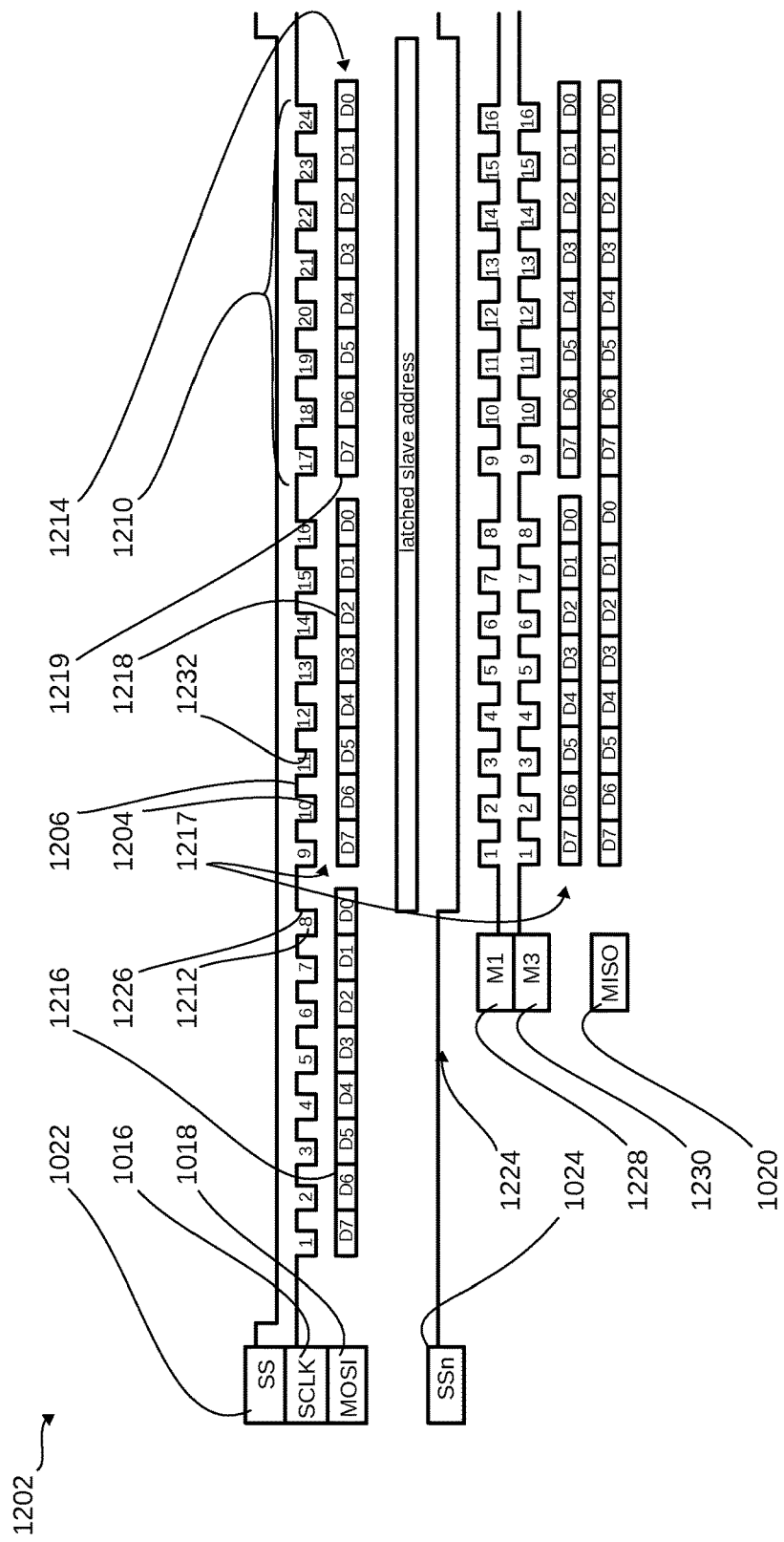
FIG. 12 is a timing diagram for the serial peripheral interface system of FIG. 10 in a mode 3 configuration.

Coupling the SS inputs 1032 of the first daisy chained device 1026 and the second daisy chained device 1028 allows the master device 1002 to communicate with both the daisy chained devices 1011 with a single address in the address header 1116 of FIG. 11 or 1216 of FIG. 12.

Further, the MOSI 1018 of the SPI bus 1014 is connected to the MOSI input 1030 of the first daisy chained device 1026, while the MISO output 1034 of the first daisy chained device 1026 is connected to the MOSI input 1030 of the second daisy chained device 1028. The MISO output 1034 of the second daisy chained device 1028 is connected to the MISO 1020 the SPI bus 1014.

It is contemplated that the first slave device 1006, with the slave expander circuitry 1008, could be implemented with a complex programmable logic device or a field-programmable gate array. It is further contemplated that the slave expander circuitry 1008 could be implemented on a digital logic control block of an integrated circuit and functioning as a slave device 1004. It is yet further contemplated that the slave expander circuitry 1008 could be implemented in multiple slave devices 1004.

The additional slave expander circuitry 1008 of the first slave device 1006 allows the other slave devices 1004 to communicate with the master device 1002 by providing the low value 1104 of FIG. 11 or 1204 of FIG. 12 on the SSn 1024 corresponding and connected to a slave device 1004 or group of slave devices 1004 when the first slave device 1006 having the slave expander circuitry 1008 is selected and another one of the slave devices 1004 is selected by the master device 1002. It is contemplated that the master device 1002 can output the low value 1104 on the SS 1022 and can provide the data stream 1114 of FIG. 11 or 1214 of FIG. 12 on the MOSI 1018.

An initial portion of the data stream 1114 can be the address header 1116 of FIG. 11 or 1216 of FIG. 12. The address header 1116 can identify one or a group of the slave devices 1004. Communication can be enabled between the master device 1002 and the slave devices 1004 once the address header 1116 is decoded and identifies the slave devices 1004. The address header 1116 is described as being 1 byte long; however it is contemplated that the address header 1116 could be longer or shorter.

If the first slave device 1006, having the slave expander circuitry 1008, is selected and another slave device 1004 connected thereto is selected, the first slave device can then output the low value 1104 on the SSn 1024 corresponding to the slave devices 1004 identified by the address header 1116 before a data portion 1117 of FIG. 11 or 1217 of FIG. 12 of the data stream 1114 arrives.

Once the low value 1104 is output on the SSn 1024 corresponding to the slave devices 1004 identified by the address header 1116, the master device 1002 will communicate directly with the slave devices 1004 identified by the address header 1116 via the MOSI 1018 and the MISO 1020.

The connection between the MISO 1020 of the SPI bus 1014 and the MISO output 1034 of the slave devices 1004 is buffered by tristate buffers 1036. The tristate buffers 1036 could be used for full duplex operation in cases where the slave devices 1004 do not tristate their MISO output 1034 when not selected. A bus switch would be used when MOSI input 1030 and MISO output 1034 are tied together on the slave devices 1004.

The SCLK 1016 is depicted being tied to the first slave device 1006, the second slave device 1010, first daisy chained device 1026, and the $n^{th}$ slave device 1012. Between the SCLK 1016 and the second slave device 1010, first daisy chained device 1026, and the $n^{th}$ slave device 1012 are optional inverters 1038.

It is contemplated that the master device 1002 could operate in mode 0 to accommodate the slave devices 1004 using either mode 0 or mode 2, or the master device 1002 could operate in mode 3 for the slave devices 1004 using either mode 1 or mode 3. When operating in mode 0, the slave devices 1004 and the master device 1002 could utilize a clock polarity with a low idle at the low value 1104 and an active-high at the high value 1106 of FIG. 11.

When operating in mode 0, the inverters 1038 are not coupled between the slave devices 1004 and the SCLK 1016. Further, when operating in mode 0 sampling of data at the MISO 1020 or MOSI 1018 occurs at the odd edges 1132 of FIG. 11.

When operating in mode 2, the slave devices 1004 could utilize a clock polarity with a high idle at the high value 1106 and an active-low at the low value 1104. When operating in mode 2, the inverters 1038 are coupled between the slave devices 1004 and the SCLK 1016. Further, when operating in mode 2 sampling of data at the MISO 1020 or MOSI 1018 occurs at the odd edges 1132.

When operating in mode 1, the slave devices 1004 and the master device 1002 could utilize a clock polarity with a low idle at the low value 1204 and an active-high at the high value 1206 of FIG. 12. When operating in mode 1, the inverters 1038 are coupled between the slave devices 1004 and the SCLK 1016. Further, when operating in mode 1 sampling of data at the MISO 1020 or MOSI 1018 occurs at the even edges 1232 of FIG. 12.

When operating in mode 3, the slave devices 1004 could utilize a clock polarity with a high idle at the high value 1206 and an active-low at the low value 1204. When operating in mode 3, the inverters 1038 are not coupled between the slave devices 1004 and the SCLK 1016. Further, when operating in mode 3 sampling of data at the MISO 1020 or MOSI 1018 occurs at the even edges 1232.

Once the master device 1002 outputs the high value 1106 on the SS 1022, the first slave device 1006 will output the high value 1106 on the SSn 1024 corresponding to the slave devices 1004 identified by the address header 1116.

It has been discovered that by using the master device 1002 only implementing mode 0 and 3 byte decoders for decoding the address header 1116 can remain the same by decoding the address on the rising edge 1126 of FIG. 11 or 1226 of FIG. 12 of the eighth the clock cycle 1112. This allows the slave devices 1004 operating on modes 0-4 to use the same decoder circuit with the inverter 1038 on the SCLK 1016 for the slave devices 1004 operating under modes 1 and 2.

Referring now to FIG. 11, therein is shown a timing diagram 1102 for the serial peripheral interface system 1000 of FIG. 10 in a mode 0 configuration. The timing diagram 1102 depicts the SS 1022, the SCLK 1016, and the MOSI 1018 outputs of the master device 1002 of FIG. 10. The timing diagram 1102 is shown for the master device 1002 operating in a mode 0.

In mode 0 the master device 1002 is depicted having the SCLK 1016 with a low idle at a low value 1104 and active-high at a high value 1106. The SS 1022 of the master device 1002 is depicted as an active low at the low value 1104.

The SCLK 1016 is shown with three groups 1110 of eight pulses, which end with an eighth clock cycle 1112. The MOSI 1018 is shown providing a data stream 1114 having an address header 1116 and a data portion 1117. The data portion 1117 of the data stream 1114 can be data such as a first data byte 1118, a second data byte 1119, along with more data depending on the operation of the slave devices 1004 of FIG. 10.

The first group 1110 of the SCLK 1016 would be transmitted during the transmission of the address header 1116. The address header 1116 can correspond to the address of one or a group of the slave devices 1004. Alternatively, the address header 1116 can correspond to the address of one of the SSns 1024.

A signal 1124 generated by the slave expander circuitry 1008 of FIG. 10 is shown as an output of the SSns 1024. The signal 1124 can be generated by a byte decoder within the slave expander circuitry 1008 after the address header 1116 is decoded and recognized as corresponding to one or a group of the slave devices 1004. Once the address header 1116 is recognized as corresponding to the address of the slave device 1004, the low value 1104 can be output on the corresponding SSn 1024 during a rising edge 1126 of the eighth clock cycle 1112.

When the low value 1104 is output on the SSn 1024 during the rising edge 1126 of the last clock cycle of the address header 1116, the next clock cycle of the SCLK 1016 will appear to be the first clock cycle to the slave devices 1004 activated by the low value 1104 on the SSn 1024 as depicted by a mode 0 slave SCLK 1128 for the slave devices 1004 operating under mode 0 and a mode 2 slave SCLK 1130 for the slave devices 1004 operating under mode 2. Further, the data portion 1117 of the data stream 1114 on the MOSI 1018 will appear to be the first portions of a data stream 1114 to the slave devices 1004 activated by the low value 1104 on the SSn 1024.

The low value 1104 remains output on the SSn 1024 of the slave expander circuitry 1008 until the master device 1002 outputs the high value 1106 on the SS 1022 allowing any number of byes or any amount of data to be transmitted over the MOSI 1018 or the MISO 1020 of FIG. 10.

The slave devices 1004 operating in mode 0 can use the SCLK 1016 as it is transmitted from the master device 1002 as depicted by the mode 0 slave SCLK 1128. The slave devices 1004 operating in mode 2 can use the SCLK 1016 once it is inverted by the inverters 1038 of FIG. 10. In the slave devices 1004 operating in mode 2, the SCLK 1016 will have a high idle at the high value 1106 and an active low at the low value 1104 once the SCLK 1016 is inverted as depicted by the mode 2 slave SCLK 1130.

When operating in mode 0 or mode 2, sampling of data occurs at odd edges 1132 such as the first, third, and fifth edges. For the slave devices 1004 operating in mode 0 the odd edges 1132 are the low-to-high transitions. For the slave devices 1004 operating in mode 2 the odd edges 1132 are the high-to-low transitions.

Referring now to FIG. 12, therein is shown a timing diagram 1202 for the serial peripheral interface system 1000 of FIG. 10 in a mode 3 configuration. The timing diagram 1202 depicts the SS 1022, the SCLK 1016, and the MOSI 1018 outputs of the master device 1002 of FIG. 10. The timing diagram 1202 is shown for the master device 1002 operating in a mode 3.

In mode 3 the master device 1002 is depicted having the SCLK 1016 with an active-low at a low value 1204 and a high idle at a high value 1206. The SS 1022 of the master device 1002 is depicted as an active low at the low value 1204.

The SCLK 1016 is shown with three groups 1210 of eight pulses, which end with an eighth clock cycle 1212. The MOSI 1018 is shown providing a data stream 1214 having an address header 1216 and a data portion 1217. The data portion 1217 of the data stream 1214 can be data such as a first data byte 1218, a second data byte 1219, along with more data depending on the operation of the slave devices 1004 of FIG. 10.

The first group 1210 of the SCLK 1016 would be transmitted during the transmission of the address header 1216. The address header 1216 can correspond to the address of one or a group of the slave devices 1004. Alternatively, the address header 1216 can correspond to the address of one of the SSns 1024.

A signal 1224 generated by the slave expander circuitry 1008 of FIG. 10 is shown as an output of the SSns 1024. The signal 1224 can be generated by a byte decoder within the slave expander circuitry 1008 after the address header 1216 is decoded and recognized as corresponding to one or a group of the slave devices 1004. Once the address header 1216 is recognized as corresponding to the address of the slave device 1004, the low value 1204 can be output on the corresponding SSn 1024 during a rising edge 1226 of the eighth clock cycle 1212.

When the low value 1204 is output on the SSn 1024 during the rising edge 1226 of the last clock cycle of the address header 1216, the next clock cycle of the SCLK 1016 will appear to be the first clock cycle to the slave devices 1004 activated by the low value 1204 on the SSn 1024 as depicted by a mode 1 slave SCLK 1228 for the slave devices 1004 operating under mode 1 and a mode 3 slave SCLK 1230 for the slave devices 1004 operating under mode 3. Further, the data portion 1217 of the data stream 1214 on the MOSI 1018 will appear to be the first portions of a data stream 1214 to the slave devices 1004 activated by the low value 1204 on the SSn 1024.

The low value 1204 remains output on the SSn 1024 of the slave expander circuitry 1008 until the master device 1002 outputs the high value 1206 on the SS 1022 allowing any number of byes or any amount of data to be transmitted over the MOSI 1018 or the MISO 1020 of FIG. 10.

The slave devices 1004 operating in mode 3 can use the SCLK 1016 as it is transmitted from the master device 1002 as depicted by the mode 3 slave SCLK 1230. The slave devices 1004 operating in mode 1 can use the SCLK 1016 once it is inverted by the inverters 1038 of FIG. 10. In the slave devices 1004 operating in mode 2, the SCLK 1016 will have a low idle at the low value 1204 and an active high at the high value 1206 once the SCLK 1016 is inverted as depicted by the mode 1 slave SCLK 1228.

When operating in mode 1 or mode 3, sampling of data occurs at even edges 1232 such as the second, fourth, and sixth edges. For the slave devices 1004 operating in mode 3 the even edges 1232 are the low-to-high transitions. For the slave devices 1004 operating in mode 1 the even edges 1232 are the high-to-low transitions.

Figure 13:
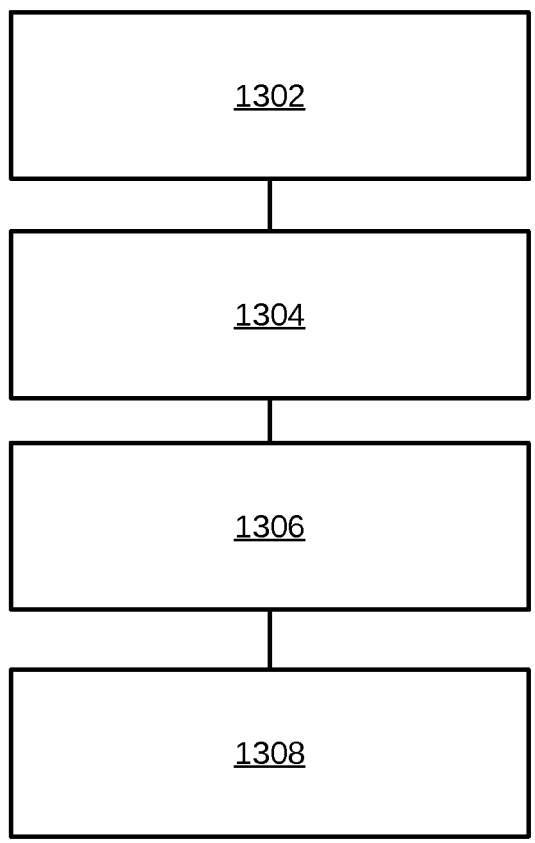
FIG. 13 is a block diagram of a method for manufacturing the serial peripheral interface system.

Referring now to FIG. 13, therein is shown a block diagram of a method for manufacturing the serial peripheral interface system. The method includes: receiving a data stream from a master device, the data stream beginning with an address in a block 1102; decoding the address as the data stream is being received in a block 1104; activating an independent slave select after the address is decoded and before a second portion of the data stream is received in a block 1106; and deactivating the independent slave select based on a slave select from the master device being deactivated in a block 1108.

Thus, it has been discovered that the serial peripheral interface system with slave expander furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the serial peripheral interface system with slave expander has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating slave expander circuitry for a serial peripheral interface system comprising:
    receiving a data stream from a master device, the data stream beginning with an address, the data stream being received with an address shift register coupled to a master output slave input, the address shift register having a serial input and a shift register parallel output;
    decoding the address as the data stream is being received with an address comparator coupled to the shift register parallel output, the address comparator configured to indicate a match between the shift register parallel output and an address constant;
    counting with a counter coupled to a clock, the counter having a counter parallel output;
    matching the counter parallel output to a slave address length with a count comparator coupled to the counter parallel output;
    activating an independent slave select after the address is decoded and before a second portion of the data stream is received; and
    deactivating the independent slave select based on a slave select from the master device being deactivated.

2. The method of claim 1 wherein receiving the data stream includes receiving the data stream beginning with the address including a module address immediately followed by a slave address.

3. The method of claim 1 wherein activating the independent slave select includes activating the independent slave select on a trailing edge of a final clock pulse for the address.

4. The method of claim 1 wherein activating the independent slave select includes activating the independent slave select for a group of slave devices daisy chained together.

5. The method of claim 1 wherein activating an independent slave select includes deactivating a tristate buffer connected to a master in slave out of a slave device identified by the address.

6. A method of operating slave expander circuitry for a serial peripheral interface system comprising:
    transmitting a data stream from a master device, the data stream beginning with an address;
    receiving the data stream from the master device with an address shift register coupled to a master output slave input, the address shift register having a serial input and a shift register parallel output;
    decoding the address as the data stream is being received with an address comparator coupled to the shift register parallel output, the address comparator configured to indicate a match between the shift register parallel output and an address constant;
    counting with a counter coupled to a clock, the counter having a counter parallel output;
    matching the counter parallel output to a slave address length with a count comparator coupled to the counter parallel output;
    activating an independent slave select for a slave device after the address is decoded and before a second portion of the data stream is received, the independent slave select directly coupled with a trace to a slave select input of the slave device;
    communicating directly to the master device with the slave device based on the independent slave select being activated; and
    deactivating the independent slave select based on a slave select from the master device being deactivated.

7. The method of claim 6 wherein communicating directly with the master device includes communicating with the master device operating in a mode zero providing the clock with a low idle and operating the slave device in a mode zero sampling at odd edges of the clock.

8. The method of claim 6 wherein communicating directly with the master device includes the master device operating in a mode zero providing the clock with a low idle, inverting the clock, and operating the slave device in a mode two sampling at odd edges of the clock.

9. The method of claim 6 wherein communicating directly with the master device includes communicating with the master device operating in a mode three providing the clock with a high idle and operating the slave device in a mode three sampling at even edges of the clock.

10. The method of claim 6 wherein communicating directly with the master device includes the master device operating in a mode three providing the clock with a high idle, inverting the clock, and operating the slave device in a mode one sampling at even edges of the clock.

11. A serial peripheral interface system comprising:
an address shift register coupled to a master output slave input configured to receive an address at a beginning of a data stream from a master device, the address shift register having a serial input and a shift register parallel output;
an address comparator coupled to the shift register parallel output, the address comparator configured to indicate a match between the shift register parallel output and an address constant;
a counter coupled to a clock, the counter having a counter parallel output;
a count comparator coupled to the counter parallel output, the count comparator indicating a match between the counter parallel output and a slave address length; and
an independent slave select coupled to an output of the address comparator and to an output of a count comparator, the independent slave select being active based on the address being decoded before a second portion of the data stream being received, and the independent slave select being not active based on a slave select from the master device being not active.

12. The system of claim 11 wherein the address comparator includes a module address decoder for decoding a module address within the address and the address comparator includes a slave address decoder for decoding a slave address within the address immediately following the module address.

13. The system of claim 11 wherein:
the slave address length is a count constant; and
the count comparator configured to compare the count constant with the counter parallel output of the counter and to activate the independent slave select on a trailing edge of a final for the address.

14. The system of claim 11 further comprising a group of daisy chained slave devices coupled to the independent slave select.

15. The system of claim 11 further comprising:
a slave device coupled to the independent slave select; and
a tristate buffer coupled to a master input slave output of the slave device and connected to the independent slave select, the tristate buffer being not active based on the independent slave select connected to the slave device being active.

16. The system of claim 11 further comprising:
a slave device having a slave select input directly coupled to the independent slave select with a trace and configured to communicate directly to the master device based on the independent slave select for the slave device being activated.

17. The system of claim 16 wherein:
the master device is a mode zero master device having the clock with a low idle; and
the slave device is a mode zero slave device having a sample at odd edges of the clock.

18. The system of claim 16 further comprising:
an inverter coupled between a clock output of the master device and a clock input of the slave device; and
wherein:
the master device is a mode zero master device having the clock with a low idle; and
the slave is a mode two slave device having a sample at odd edges of the clock.

19. The system of claim 16 wherein:
the master device is a mode three master device having the clock with a high idle; and
the slave device is a mode three slave device having a sample at even edges of the clock.

20. The system of claim 16 further comprising:
an inverter coupled between a clock output of the master device and a clock input of the slave device; and
wherein:
the master device is a mode three master device having the clock with a high idle; and
the slave is a mode one slave device having a sample at even edges of the clock.

* * * * *